United States Patent
Jiang

(10) Patent No.: US 11,356,890 B2
(45) Date of Patent: Jun. 7, 2022

(54) METHOD AND APPARATUS FOR TRANSMITTING RADIO RESOURCE CONTROL MESSAGE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 147 days.

(21) Appl. No.: 16/616,161

(22) PCT Filed: May 24, 2017

(86) PCT No.: PCT/CN2017/085725
§ 371 (c)(1),
(2) Date: Nov. 22, 2019

(87) PCT Pub. No.: WO2018/214062
PCT Pub. Date: Nov. 29, 2018

(65) Prior Publication Data
US 2020/0137617 A1    Apr. 30, 2020

(51) Int. Cl.
*H04L 1/00*    (2006.01)
*H04W 28/02*    (2009.01)
(Continued)

(52) U.S. Cl.
CPC ... *H04W 28/0278* (2013.01); *H04W 28/0252* (2013.01); *H04W 48/18* (2013.01); *H04W 76/27* (2018.02)

(58) Field of Classification Search
None
See application file for complete search history.

(56) References Cited

U.S. PATENT DOCUMENTS

2013/0188705 A1    7/2013  Liu
2017/0064534 A1*   3/2017  Loehr ............... H04W 72/0413
(Continued)

FOREIGN PATENT DOCUMENTS

CN    101516104 A    8/2009
CN    105898894 A    8/2016
(Continued)

OTHER PUBLICATIONS

ISA State Intellectual Property Office of the People's Republic of China, International Search Report Issued in Application No. PCT/CN2017/085725, dated Feb. 22, 2018, WIPO, 4 pages.
(Continued)

*Primary Examiner* — Clemence S Han
(74) *Attorney, Agent, or Firm* — Syncoda LLC; Feng Ma

(57) ABSTRACT

A method for transmitting an RRC message includes: a target buffer report corresponding to a target SRB reported by a terminal is received, where the target SRB is an SRB for transmitting a target RRC message to be transmitted by the terminal; resource configuration is performed for the target SRB according to the target buffer report to acquire a resource configuration result; and the resource configuration result is transmitted to the terminal, so that the terminal determines a target RAN slice corresponding to the target SRB from among a plurality of RAN slices pre-configured for the terminal according to the resource configuration result, and transmits the target RRC message through the target RAN slice. As such, an RRC message may be transmitted through a plurality of RAN slices.

18 Claims, 12 Drawing Sheets

(51) Int. Cl.
*H04W 76/27* (2018.01)
*H04W 48/18* (2009.01)

(56) References Cited

U.S. PATENT DOCUMENTS

| | | | |
|---|---|---|---|
| 2017/0318565 A1* | 11/2017 | Golitschek Edler von Elbwart ... | H04W 72/042 |
| 2019/0230584 A1* | 7/2019 | Lou | H04W 76/27 |
| 2019/0230725 A1* | 7/2019 | Lou | H04W 76/27 |
| 2019/0356450 A1* | 11/2019 | He | H04W 72/0406 |
| 2020/0205176 A1* | 6/2020 | Yu | H04W 72/042 |
| 2020/0267753 A1* | 8/2020 | Adjakple | H04W 72/1226 |

FOREIGN PATENT DOCUMENTS

| | | |
|---|---|---|
| CN | 106572516 A | 4/2017 |
| CN | 106656418 A | 5/2017 |

OTHER PUBLICATIONS

Coolpad, "Discussion on UE RRC Modeling to Support Multiple Slices", 3GPP TSG RAN WG2#98, R2-1704551, Mar. 19, 2017, 3 pages.

State Intellectual Property Office of the People's Republic of China, Office Action and Search Report Issued in Application No. 2017800003711, dated Mar. 29, 2021, 26 pages, (Submitted with Machine Translation).

ISA State Intellectual Property Office of the People's Republic of China, Written Opinion of the International Searching Authority Issued in Application No. PCT/CN2017/085725, dated Feb. 22, 2018, WIPO, 9 pages.

* cited by examiner

METHOD AND APPARATUS FOR TRANSMITTING RADIO RESOURCE CONTROL MESSAGE

CROSS-REFERENCE TO RELATED APPLICATION

This application is a national stage of International Application No. PCT/CN2017/085725 filed on May 24, 2017, the disclosure of which is hereby incorporated by reference in its entirety.

TECHNICAL FIELD

The present disclosure relates to the field of communication, and in particular, to a method and an apparatus for transmitting a radio resource control message.

BACKGROUND

Standardization related to a 5G NR (New Radio) system is being carried out in a 3GPP ($3^{rd}$ Generation Partnership Project). A network slicing technology is introduced into the 5G system, which allows networks, e.g., a CN (Core Network) and a RAN (Radio Access Network), to be divided into a plurality of slices. Different services are transmitted in different slices and do not interfere with each other. A billing policy, a security policy, and a quality of service policy for each slice may be different.

In the related art, an RRC (Radio Resource Control) message is transmitted from/to a base station that establishes a connection with a terminal, which causes the RRC message to be affected by loads and channels of an entire cell and thereby is not conducive to isolation between the slices.

SUMMARY

In order to overcome the problems existing in the related art, a method and an apparatus for transmitting an RRC message are provided by examples of the present disclosure.

According to a first aspect of the examples of the present disclosure, a method of transmitting an RRC message is provided, where the method is applied to a base station, and the method includes:

receiving a target buffer report corresponding to a target Signaling Radio Bearer (SRB) which is reported by a terminal, where the target SRB is an SRB for transmitting a target RRC message which is to be transmitted by the terminal;

performing resource configuration for the target SRB according to the target buffer report to acquire a resource configuration result; and transmitting the resource configuration result to the terminal, so that the terminal determines, according to the resource configuration result, a target RAN slice corresponding to the target SRB from among a plurality of RAN slices pre-configured for the terminal and transmits the target RRC message through the target RAN slice.

Optionally, the target buffer report indicates a buffer amount corresponding to the target SRB; or the target buffer report indicates the buffer amount corresponding to the target SRB and a buffer amount corresponding to at least one of the plurality of the RAN slices pre-configured for the terminal;

performing the resource configuration for the target SRB according to the target buffer report to acquire the resource configuration result includes:

according to the buffer amount corresponding to the target SRB which is indicated in the target buffer report, acquiring the resource configuration result that includes information on a RAN slice where a first target resource corresponding to the target SRB is located; or according to the buffer amount corresponding to the target SRB which is indicated in the target buffer report, performing the resource configuration to acquire the resource configuration result that includes the first target resource corresponding to the target SRB.

Optionally, the target buffer report indicates a sum of a buffer amount corresponding to the target SRB and a buffer amount corresponding to at least one of the plurality of the RAN slices pre-configured for the terminal;

performing the resource configuration for the target SRB according to the target buffer report to acquire the resource configuration result includes:

according to the sum of the buffer amounts indicated in the target buffer report, performing the resource configuration for the target SRB and the at least one of the plurality of the RAN slices pre-configured for the terminal, so as to acquire the resource configuration result that includes a second target resource which is shared by the target SRB and the at least one RAN slice; or taking slice information on a predefined RAN slice that provides a resource service for the terminal as information on a RAN slice where a first target resource corresponding to the target SRB is located, so as to acquire the resource configuration result that includes the information on the RAN slice where the first target resource is located.

According to a second aspect of the examples of the present disclosure, a method of transmitting an RRC message is provided, where the method is applied to a terminal, and the method includes:

reporting a target buffer report corresponding to a target SRB to a base station, where the target SRB is an SRB for transmitting a target RRC message which is to be transmitted by the terminal;

receiving, from the base station, a resource configuration result associated with resource configuration performed for the target SRB according to the target buffer report;

according to the resource configuration result, determining a target RAN slice corresponding to the target SRB from among a plurality of RAN slices pre-configured for the terminal; and transmitting the target RRC message through the target RAN slice.

Optionally, the target buffer report indicates a buffer amount corresponding to the target SRB;

the target buffer report indicates the buffer amount corresponding to the target SRB, and a buffer amount corresponding to at least one of the plurality of the RAN slices pre-configured for the terminal; or the target buffer report indicates a sum of the buffer amount corresponding to the target SRB and the buffer amount corresponding to the at least one of the plurality of the RAN slices pre-configured for the terminal.

Optionally, determining the target RAN slice corresponding to the target SRB from among the plurality of the RAN slices pre-configured for the terminal according to the resource configuration result includes:

when the resource configuration result includes information on a RAN slice where a first target resource corresponding to the target SRB is located, taking the RAN slice indicated by the information as the target RAN slice;

when the resource configuration result includes the first target resource corresponding to the target SRB, taking a RAN slice, where the first target resource is located, from among the plurality of the RAN slices as the target RAN slice; and when the resource configuration result includes a second target resource shared by the target SRB and at least one of the plurality of the RAN slices, taking a RAN slice, where the second target resource is located, from among the plurality of the RAN slices as the target RAN slice.

According to a third aspect of the examples of the present disclosure, a method of transmitting an RRC message is provided, where the method is applied to a base station, and the method includes:

determining a RAN slice, for which SRB configuration is to be performed, from among a plurality of RAN slices pre-configured for a terminal; and configuring a respective SRB for the RAN slice for which the SRB configuration is to be performed, so that the terminal determines a target RAN slice from among the plurality of the RAN slices, and transmits a target RRC message through the target RAN slice based on a target SRB configured by the base station for the target RAN slice, where the target SRB is an SRB for transmitting the target RRC message.

Optionally, determining the RAN slice, for which the SRB configuration is to be performed, from among the plurality of the RAN slices pre-configured for the terminal includes:

from among the plurality of the RAN slices pre-configured for the terminal, taking a RAN slice corresponding to a current service of the terminal as the RAN slice for which the SRB configuration is to be performed; or taking each of the plurality of the RAN slices as the RAN slice for which the SRB configuration is to be performed.

According to a fourth aspect of the examples of the present disclosure, a method of transmitting an RRC message is provided, where the method is applied to a terminal, and the method includes:

determining a target RAN slice corresponding to a target RRC message which is to be transmitted from among a plurality of RAN slices pre-configured for the terminal; and transmitting the target RRC message through the target RAN slice based on a target SRB configured by a base station for the target RAN slice.

Optionally, determining the target RAN slice corresponding to the target RRC message which is to be transmitted from among the plurality of the RAN slices pre-configured for the terminal includes:

when each of cell signal qualities of the terminal respectively on the plurality of the RAN slices is lower than a preset threshold, taking each of the plurality of the RAN slices as the target RAN slice.

Optionally, determining the target RAN slice corresponding to the target RRC message which is to be transmitted from among the plurality of the RAN slices pre-configured for the terminal includes:

determining a message type to which the target RRC message belongs; and according to the message type, determining the target RAN slice corresponding to the target RRC message which is to be transmitted from among the plurality of the RAN slices pre-configured for the terminal.

Optionally, determining the message type to which the target RRC message belongs includes:

when the target RRC message is for performing a common control function and does not carry user data, determining that the message type to which the target RRC message belongs is a first message type; and when the target RRC message carries the user data, determining that the message type to which the target RRC message belongs is the first message type or a second message type according to a message content of the target RRC message.

Optionally, determining that the message type to which the target RRC message belongs is the first message type or the second message type according to the message content of the target RRC message includes:

when the target RRC message is a connection reconfiguration message, while the message content is for configuring the RAN slice, determining that the message type to which the target RRC message belongs is the second message type, and while the message content is not for configuring the RAN slice, determining that the message type to which the target RRC message belongs is the first message type; and when the target RRC message is an uplink information transmission message or a downlink information transmission message, while the message content includes a common Network Attached Storage (NAS) message or it cannot be determined whether an NAS message belongs to the common NAS message, determining that the message type to which the target RRC message belongs is the first message type, and while the message content does not comprise the common NAS message, determining that the message type to which the target RRC message belongs is the second message type.

Optionally, the method further includes:

when the message type to which the target RRC message belongs is the second message type, while the base station does not perform SRB configuration for a RAN slice corresponding to the target RRC message, re-determining that the message type to which the target RRC message belongs is the first message type.

Optionally, when the message type is the first message type, determining the target RAN slice corresponding to the target RRC message which is to be transmitted from among the plurality of the RAN slices pre-configured for the terminal according to the message type includes:

when the target RRC message is not triggered by a service, selecting a RAN slice that meets a preset condition from among the plurality of the RAN slices as the target RAN slice; and when the target RRC message is triggered by the service, taking a RAN slice corresponding to the service from among the plurality of the RAN slices as the target RAN slice.

Optionally, when the message type is the second message type, determining the target RAN slice corresponding to the target RRC message which is to be transmitted from among the plurality of the RAN slices pre-configured for the terminal according to the message type includes:

when a number of RAN slices corresponding to the target RRC message is one, taking a RAN slice corresponding to the target RRC message as the target RAN slice; and when the number of the RAN slices corresponding to the target RRC message is more than one, selecting one RAN slice that meets a preset condition from among the RAN slices corresponding to the target RRC message as the target RAN slice.

Optionally, the preset condition includes a best channel quality and/or a lowest load.

According to a fifth aspect of the examples of the present disclosure, an apparatus for transmitting an RRC message is provided, where the apparatus is applied to a base station, and the apparatus includes:

a first receiving module configured to receive a target buffer report corresponding to a target SRB which is reported by a terminal, where the target SRB is an SRB for transmitting a target RRC message which is to be transmitted by the terminal;

a resource configuring module configured to perform resource configuration for the target SRB according to the target buffer report to acquire a resource configuration result; and a first transmitting module configured to transmit the resource configuration result to the terminal, so that the terminal determines, according to the resource configuration result, a target RAN slice corresponding to the target SRB from among a plurality of RAN slices pre-configured for the terminal and transmits the target RRC message through the target RAN slice.

Optionally, the target buffer report indicates a buffer amount corresponding to the target SRB; or the target buffer report indicates the buffer amount corresponding to the target SRB and a buffer amount corresponding to at least one of the plurality of the RAN slices pre-configured for the terminal;

the resource configuring module includes any of:

a first configuring sub-module configured to acquire, according to the buffer amount corresponding to the target SRB which is indicated in the target buffer report, the resource configuration result that includes information on a RAN slice where a first target resource corresponding to the target SRB is located; and a second configuring sub-module configured to perform the resource configuration according to the buffer amount corresponding to the target SRB which is indicated in the target buffer report, so as to acquire the resource configuration result that includes the first target resource corresponding to the target SRB.

Optionally, the target buffer report indicates a sum of a buffer amount corresponding to the target SRB and a buffer amount corresponding to at least one of the plurality of the RAN slices pre-configured for the terminal;

the resource configuring module includes any of:

a third configuring sub-module configured to perform, according to the sum of the buffer amounts indicated in the target buffer report, the resource configuration for the target SRB and the at least one of the plurality of the RAN slices pre-configured for the terminal, so as to acquire the resource configuration result that includes a second target resource which is shared by the target SRB and the at least one RAN slice; and a fourth configuring sub-module configured to take slice information on a predefined RAN slice that provides a resource service for the terminal as information on a RAN slice where a first target resource corresponding to the target SRB is located, so as to acquire the resource configuration result that includes the information on the RAN slice where the first target resource is located.

According to a sixth aspect of the examples of the present disclosure, an apparatus for transmitting an RRC message is provided, where the apparatus is applied to a terminal, and the apparatus includes:

a reporting module configured to report a target buffer report corresponding to a target SRB to a base station, where the target SRB is an SRB for transmitting a target RRC message which is to be transmitted by the terminal;

a second receiving module configured to receive, from the base station, a resource configuration result associated with resource configuration performed for the target SRB according to the target buffer report;

a first slice determining module configured to determine, according to the resource configuration result, a target RAN slice corresponding to the target SRB from among a plurality of RAN slices pre-configured for the terminal; and a second transmitting module configured to transmit the target RRC message through the target RAN slice.

Optionally, the target buffer report indicates a buffer amount corresponding to the target SRB; or the target buffer report indicates the buffer amount corresponding to the target SRB, and a buffer amount corresponding to at least one of the plurality of the RAN slices pre-configured for the terminal; or the target buffer report indicates a sum of the buffer amount corresponding to the target SRB and the buffer amount corresponding to the at least one of the plurality of the RAN slices pre-configured for the terminal.

Optionally, the first slice determining module includes:

a first determining sub-module configured to, when the resource configuration result includes information on a RAN slice where a first target resource corresponding to the target SRB is located, take the RAN slice indicated by the information as the target RAN slice;

a second determining sub-module configured to, when the resource configuration result includes the first target resource corresponding to the target SRB, take a RAN slice, where the first target resource is located, from among the plurality of the RAN slices as the target RAN slice; and a third determining sub-module configured to, when the resource configuration result includes a second target resource shared by the target SRB and at least one of the plurality of the RAN slices, take a RAN slice, where the second target resource is located, from among the plurality of the RAN slices as the target RAN slice.

According to a seventh aspect of the examples of the present disclosure, an apparatus for transmitting an RRC message is provided, where the apparatus is applied to a base station, and the apparatus includes:

a first determining module configured to determine a RAN slice, for which SRB configuration is to be performed, from among a plurality of RAN slices pre-configured for a terminal; and an SRB configuring module configured to configure a respective SRB for the RAN slice for which the SRB configuration is to be performed, so that the terminal determines a target RAN slice from among the plurality of the RAN slices, and transmits a target RRC message through the target RAN slice based on a target SRB configured by the base station for the target RAN slice, where the target SRB is an SRB for transmitting the target RRC message.

Optionally, the first determining module includes any of:

a fourth determining sub-module configured to take a RAN slice, corresponding to a current service of the terminal, from among the plurality of the RAN slices pre-configured for the terminal as the RAN slice for which the SRB configuration is to be performed; and a fifth determining sub-module configured to take each of the plurality of the RAN slices as the RAN slice for which the SRB configuration is to be performed.

According to an eighth aspect of the examples of the present disclosure, an apparatus for transmitting an RRC message is provided, where the apparatus is applied to a terminal, and the apparatus includes:

a second slice determining module configured to determine a target RAN slice corresponding to a target RRC message which is to be transmitted from among a plurality of RAN slices pre-configured for the terminal; and a third transmitting module configured to transmit the target RRC message through the target RAN slice based on a target SRB configured by a base station for the target RAN slice.

Optionally, the second slice determining module includes:

a sixth determining sub-module configured to, when each of cell signal qualities of the terminal respectively on the plurality of the RAN slices is lower than a preset threshold, take each of the plurality of the RAN slices as the target RAN slice.

Optionally, the second slice determining module includes:

a message type determining sub-module configured to determine a message type to which the target RRC message belongs; and a seventh determining sub-module configured to determine, according to the message type, the target RAN slice corresponding to the target RRC message which is to be transmitted from among the plurality of the RAN slices pre-configured for the terminal.

Optionally, the message type determining sub-module includes:

a first determining unit configured to, when the target RRC message is for performing a common control function and does not carry user data, determine that the message type to which the target RRC message belongs is a first message type; and a second determining unit configured to, when the target RRC message carries the user data, determine that the message type to which the target RRC message belongs is the first message type or a second message type according to a message content of the target RRC message.

Optionally, the second determining unit includes:

a first determining sub-unit configured to, when the target RRC message is a connection reconfiguration message, while the message content is for configuring the RAN slice, determine that the message type to which the target RRC message belongs is the second message type, and while the message content is not for configuring the RAN slice, determine that the message type to which the target RRC message belongs is the first message type; and a second determining sub-unit configured to, when the target RRC message is an uplink information transmission message or a downlink information transmission message, while the message content includes a common NAS message or it cannot be determined whether an NAS message belongs to the common NAS message, determine that the message type to which the target RRC message belongs is the first message type, and while the message content does not comprise the common NAS message, determine that the message type to which the target RRC message belongs is the second message type.

Optionally, the apparatus further includes:

a second determining module configured to, when the message type to which the target RRC message belongs is the second message type, while the base station does not perform SRB configuration for a RAN slice corresponding to the target RRC message, re-determine that the message type to which the target RRC message belongs is the first message type.

Optionally, the seventh determining sub-module includes:

a third determining unit configured to, when the message type is the first message type, while the target RRC message is not triggered by a service, select a RAN slice that meets a preset condition from among the plurality of the RAN slices as the target RAN slice; and a fourth determining unit configured to, when the message type is the first message type, while the target RRC message is triggered by the service, take a RAN slice corresponding to the service from among the plurality of the RAN slices as the target RAN slice.

Optionally, the seventh determining sub-module includes:

a fifth determining unit configured to, when the message type is the second message type, while a number of RAN slices corresponding to the target RRC message is one, take a RAN slice corresponding to the target RRC message as the target RAN slice; and a sixth determining unit configured to, when the message type is the second message type, while the number of the RAN slices corresponding to the target RRC message is more than one, select one RAN slice that meets a preset condition from among the RAN slices corresponding to the target RRC message as the target RAN slice.

Optionally, the preset condition includes a best channel quality and/or a lowest load.

According to a ninth aspect of the examples of the present disclosure, a computer-readable storage medium is provided, where the storage medium stores a computer program for performing a method of transmitting an RRC message according to the first aspect.

According to a tenth aspect of the examples of the present disclosure, a computer-readable storage medium is provided, where the storage medium stores a computer program for performing a method of transmitting a radio resource control RRC message according to the second aspect.

According to an eleventh aspect of the examples of the present disclosure, a computer-readable storage medium is provided, where the storage medium stores a computer program for performing a method of transmitting a radio resource control RRC message according to the third aspect.

According to a twelfth aspect of the examples of the present disclosure, a computer-readable storage medium is provided, where the storage medium stores a computer program for performing a method of transmitting a radio resource control RRC message according to the fourth aspect.

According to a thirteenth aspect of the examples of the present disclosure, an apparatus for transmitting an RRC message is provided, which is applied to a base station, and includes:

a processor; and a memory storing instructions executable by the processor;

where the processor is configured to:

receive a target buffer report corresponding to a target SRB which is reported by a terminal, where the target SRB is an SRB for transmitting a target RRC message which is to be transmitted by the terminal;

perform resource configuration for the target SRB according to the target buffer report to acquire a resource configuration result; and transmit the resource configuration result to the terminal, so that the terminal determines, according to the resource configuration result, a target RAN slice corresponding to the target SRB from among a plurality of RAN slices pre-configured for the terminal, and transmits the target RRC message through the target RAN slice.

According to a fourteenth aspect of the examples of the present disclosure, an apparatus for transmitting an RRC message, which is applied to a terminal, and includes:

a processor; and a memory storing instructions executable by the processor;

where the processor is configured to:

report a target buffer report corresponding to a target SRB to a base station, where the target SRB is an SRB for transmitting a target RRC message which is to be transmitted by the terminal;

receive, from the base station, a resource configuration result associated with resource configuration performed for the target SRB according to the target buffer report;

according to the resource configuration result, determine a target RAN slice corresponding to the target SRB from among a plurality of RAN slices pre-configured for the terminal; and transmit the target RRC message through the target RAN slice.

According to a fifteenth aspect of the examples of the present disclosure, an apparatus for transmitting an RRC message is provided, which is applied to a base station, and includes:

a processor; and a memory storing instructions executable by the processor;

where the processor is configured to:

determine a RAN slice, for which SRB configuration is to be performed, from among a plurality of RAN slices pre-configured for a terminal; and configure a respective SRB for the RAN slice for which the SRB configuration is to be performed, so that the terminal determines a target RAN slice from among the plurality of the RAN slices, and transmits a target RRC message through the target RAN slice based on a target SRB configured by the base station for the target RAN slice, where the target SRB is an SRB for transmitting the target RRC message.

According to a sixteenth aspect of the examples of the present disclosure, an apparatus for transmitting an RRC message is provided, which is applied to a terminal, and includes:

a processor; and a memory storing instructions executable by the processor;

where the processor is configured to:

determine a target RAN slice corresponding to a target RRC message which is to be transmitted from among a plurality of RAN slices pre-configured for the terminal; and transmit the target RRC message through the target RAN slice based on a target SRB configured by a base station for the target RAN slice.

The technical solutions provided by the examples of the present disclosure may include the following beneficial effects.

In the examples of the present disclosure, the base station may perform the resource configuration for the target SRB according to the target buffer report which is reported by the terminal, and transmit the resource configuration result to the terminal. Then, the terminal determines, according to the resource configuration result, the target RAN slice corresponding to the target SRB from among the plurality of the RAN slices pre-configured for the terminal, and transmits the target RRC message through the target RAN slice. Through this process, a purpose of transmitting RRC messages through a plurality of RAN slices is achieved, and a problem of an excessive influence on the RRC messages may be avoided. The problem is caused by a cell load and a channel situation when the RRC messages are transmitted in a cell where the terminal is located, and the problem is not conductive to isolation between slices.

In the examples of the present disclosure, according to the target buffer report, the base station may separately configure information for the terminal, where the information is on a RAN slice where the first target resource corresponding to the target SRB is located, or the base station may directly configure the first target resource corresponding to the target SRB, or the base station may also configure the second target resource shared by the target SRB and at least one of the plurality of the RAN slices pre-configured for the terminal. In the examples of the present disclosure, each of the RRC messages related to the SRB may be mapped to any of the RAN slices. After the base station performs the resource configuration for the target SRB in the above-described multiple manners, the target RRC message may be transmitted through the target RAN slice associated with corresponding resource. A purpose of transmitting the RRC message through the resources associated with the plurality of the RAN slices is achieved.

In the examples of the present disclosure, the terminal may report the target buffer report to the base station. The target buffer report corresponds to the target SRB. After the resource configuration result obtained by performing resource configuration for the target SRB according to the target buffer report is received from the base station, the target RAN slice corresponding to the target SRB is determined according to the resource configuration result, and thereby the target RRC message is transmitted through the target RAN slice. Through this process, a purpose of transmitting the RRC messages by the terminal through the plurality of the RAN slices is achieved, and a problem of an excessive influence on the RRC messages may be avoided. The problem is caused by a cell load and a channel situation when the RRC messages are transmitted in a cell where the terminal is located, and the problem is not conductive to isolation between slices.

In the examples of the present disclosure, the base station may first determine the RAN slice, for which SRB configuration is to be performed, from among a plurality of RAN slices pre-configured for a terminal, and further configure a respective SRB for which the SRB configuration is to be performed, so that the terminal transmits the RRC messages through the plurality of the RAN slices.

In the examples of the present disclosure, the terminal may determine, from among the plurality of RAN slices pre-configured for the terminal, the target RAN slice corresponding to the target RRC message, and the target RRC message is an RRC message to be transmitted by the terminal. Further, the terminal transmits the target RRC message through the target RAN slice based on the target SRB configured by the base station for the target RAN slice. Through this process, after determining the target RAN slice, the terminal may transmit the RRC message through the target RAN slice. Thus, a purpose of transmitting the RRC messages through the plurality of the RAN slices is achieved, and it is avoided an excessive impact caused by a separate RAN slice transmitting the RRC message and a problem of isolation between slices.

In the examples of the present disclosure, optionally, the terminal may transmit the target RRC message through the plurality of the RAN slices when each of the cell signal qualities respectively on the plurality of the RAN slices is lower than the preset threshold, e.g., when the cell signal quality is poor, so that a transmission quality of the RRC message may be improved.

In the examples of the present disclosure, the terminal may further determine the target RAN slice from among the plurality of RAN slices according to the message type to which the target RRC message belongs, which also achieves the purpose of transmitting the target RRC messages through the plurality of RAN slices.

It should be understood that the above general description and the following detailed description are only exemplary and explanatory, and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
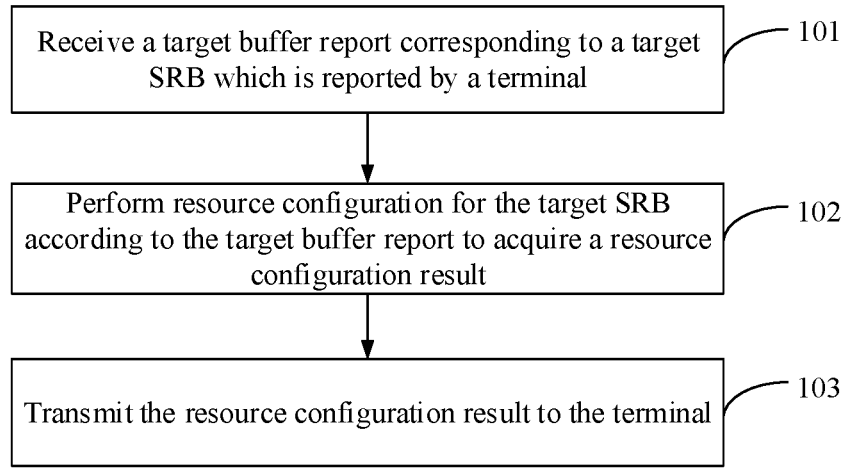
FIG. 1 is a flowchart illustrating a method of transmitting an RRC message according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a," "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

The technical solution provided by the present disclosure is applicable to a 5G network. In a transmission scenario of an RRC message provided by the present disclosure, a terminal is in an idle state, and slice information of a CN slice and slice information of a RAN slice configured for the terminal are acquired in advance by using at least one of an NAS (Network Attached Storage) message, a system message, or an RRC message.

Further, a NAS layer of the terminal may indicate an RRC layer to establish an RRC connection with a base station. After the connection is established, the base station may transmit a connection reconfiguration message to the terminal. Optionally, the connection reconfiguration message may further include at least one of the followings:

configuration information of DRBs (Data Radio Bearers)/SRBs (Signaling Radio Bearers) corresponding to each slice; or configuration information of a MAC (Media Access Control) layer/a PHY (PHYsical) layer.

The configuration information of the DRBs/SRBs may include a bearer identifier (bearer identifiers of the DRBs/SRBs associated with different slices may be identical), PDCP (Packet Data Convergence Protocol)/RLC (Radio Link Control) configuration information, logical channel configuration information, and the like.

The configuration information of the MAC layer may include a BSR (Buffer Status Report), DRX (Discontinuous Reception), a PHR (Power Headroom Report), a TimeAlignmentTimer (an uplink time alignment timer), a SR (Scheduling Request), a HARQ (Hybrid Automatic Repeat reQuest), and the like.

The configuration information of the PHY layer may include configuration information of physical channels, such as a PDSCH (Physical Downlink Shared CHannel), a PUCCH (Physical Uplink Control CHannel), and a PUSCH (Physical Uplink Shared CHannel), antenna configuration information, reference symbol configuration information, power control configuration information, and the like.

In examples of the present disclosure, based on the above scenario, an RRC message may be transmitted through a plurality of RAN slices in any of the following manners.

In a first manner, all SRBs do not belong to any RAN slice, and information on a RAN slice corresponding to an SRB is not included in the connection reconfiguration message transmitted by the base station.

In this manner, a method of transmitting an RRC message is provided by examples of the present disclosure, which may be applied to a base station. FIG. 1 is a flowchart illustrating a method of transmitting an RRC message according to an example, which may include the following steps.

At step 101, a target buffer report corresponding to a target SRB which is reported by a terminal is received, where the target SRB is an SRB for transmitting a target RRC message which is to be sent by the terminal.

At step 102, resource configuration is performed for the target SRB according to the target buffer report to acquire a resource configuration result.

At step 103, the resource configuration result is transmitted to the terminal, so that the terminal determines, according to the resource configuration result, a target RAN slice corresponding to the target SRB from among a plurality of RAN slices pre-configured for the terminal, and transmits the target RRC message through the target RAN slice.

In this example, the base station performs resource configuration for the target SRB according to the target buffer report reported by the terminal, and transmits the resource configuration result to the terminal. After determining, according to the resource configuration result, the target RAN slice corresponding to the target SRB from among the plurality of the RAN slices pre-configured for the terminal, the terminal can transmit the target RRC message through the target RAN slice. Through this process, a purpose of transmitting RRC messages through a plurality of RAN slices is achieved, and a problem of an excessive influence on the RRC messages may be avoided. The problem is caused by a cell load and a channel situation when the RRC messages are transmitted in a cell where the terminal is located, and the problem is not conductive to isolation between slices.

For step 101, the terminal can determine a buffer amount corresponding to the target SRB according to the related art, where the target SRB is an SRB for transmitting a target RRC message currently to be transmitted by the terminal.

In the step, after generating the target buffer report, the terminal transmits the target buffer report to the base station through a connection established with the base station according to the related art. The base station can directly receive the target buffer report.

For step 102, the base station may perform resource configuration for the target SRB according to different contents included in the target buffer report, so as to acquire the resource configuration result.

In a first case, the target buffer report is configured only to indicate a buffer amount corresponding to the target SRB.

At this time, the base station may perform time domain and frequency domain resource configuration directly according to the buffer amount corresponding to the target SRB. After determining a time domain resource and a frequency domain resource corresponding to the target SRB, e.g., a first target resource, a RAN slice where the first target resource is located may be determined according to a preset distribution condition of the time domain resources and the frequency domain resources. Finally, information on a RAN slice where the first target resource is located is taken as the resource configuration result.

The base station may also pre-define one or more RAN slices for providing a resource service to the terminal. Optionally, slice information on a pre-defined RAN slice may be directly taken as the resource configuration result.

Alternatively, the base station may directly take the first target resource as the resource configuration result after determining the time domain resource and the frequency domain resource corresponding to the target SRB, e.g., the first target resource.

In a second case, the target buffer report indicates a buffer amount corresponding to the target SRB, and a buffer amount corresponding to at least one of the plurality of the RAN slices pre-configured for the terminal.

In this case, the target SRB and the at least one RAN slice multiplex the same target buffer report. The base station may also perform resource configuration according to the buffer amount of the target SRB which is indicated in the target buffer report. According to the manners provided by the above examples, the information on the RAN slice where the first target resource corresponding to the target SRB is located or the first target resource is taken as the resource configuration result.

In a third case, the target buffer report indicates a sum of a buffer amount corresponding to the target SRB and a buffer amount corresponding to at least one of the plurality of the RAN slices pre-configured for the terminal.

In this case, the target buffer report indicates the sum of the buffer amount associated with the target SRB and the buffer amount associated with the at least one RAN slice.

Optionally, the base station may perform time domain and frequency domain resource configuration directly according to the sum of the buffer amounts, so as to acquire a second target resource shared by the target SRB and the at least one RAN slice, and the second target resource is taken as the resource configuration result.

Alternatively, the base station may directly take slice information of a pre-defined RAN slice that provides the resource service for the terminal as information on a RAN slice where a first target resource corresponding to the target SRB is located, and finally, the base station acquires the resource configuration result including the information on the RAN slice where the first target resource is located.

For step 103, after acquiring the resource configuration result, the base station can transmit the resource configuration result to the terminal directly through the connection established with the terminal according to the related art.

After receiving the resource configuration result, the terminal can determine the target RAN slice from among the plurality of the RAN slices pre-configured for the terminal according to the resource configuration result. Further, the target RRC message which is to be sent is transmitted through the target RAN slice.

In this example, the base station may perform the resource configuration for the target SRB in a plurality of manners, so that the terminal may transmit RRC messages through the plurality of the RAN slices according to the resource configuration result from the base station.

Figure 2:
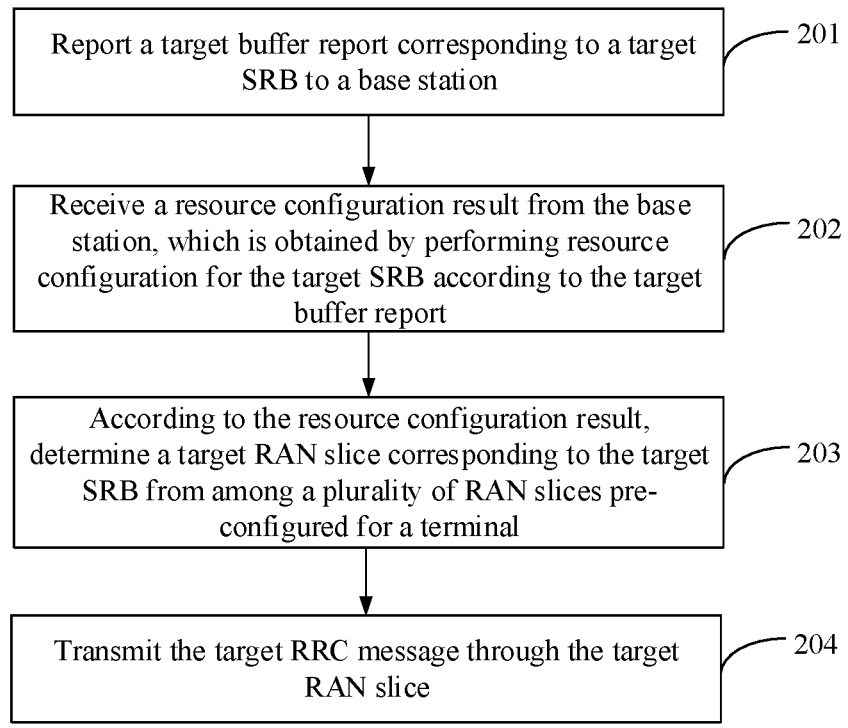
FIG. 2 is a flowchart illustrating another method of transmitting an RRC message according to an example.

For this manner of transmitting the RRC messages through the plurality of the RAN slices, corresponding to the RRC message transmission method on a base station side, another method of transmitting an RRC message is further provided by examples of the present disclosure, which may be applied to a terminal. FIG. 2 is a flowchart illustrating another method of transmitting an RRC message according to an example, which may include the following steps.

At step 201, a target buffer report corresponding to a target SRB is reported to a base station, where the target SRB is an SRB for transmitting a target RRC message which is to be sent by a terminal.

At step 202, a resource configuration result is received from the base station, which is obtained by performing resource configuration for the target SRB according to the target buffer report.

At step 203, according to the resource configuration result, a target RAN slice corresponding to the target SRB is determined from among a plurality of RAN slices pre-configured for the terminal.

At step 204, the target RRC message is transmitted through the target RAN slice.

In this example, the terminal can report the target buffer report to the base station. A buffer amount indicated in the target buffer report is greater than or equal to a buffer amount corresponding to the target SRB. After the resource configuration result associated with the resource configuration performed for the target SRB according to the target buffer report is received from the base station, the target RAN slice corresponding to the target SRB is determined according to the resource configuration result. Then the target RRC message is transmitted through the target RAN slice. Through this process, a purpose of transmitting the RRC messages by the terminal through different RAN slices is achieved, and a problem of an excessive influence on the RRC messages may be avoided. The problem is caused by a cell load and a channel situation when the RRC messages are transmitted in a cell where the terminal is located, and the problem is not conductive to isolation between slices.

For step 201, the terminal may acquire a buffer amount corresponding to the target SRB according to related art.

Optionally, the target buffer report reported to the base station may include only the buffer amount corresponding to the target SRB. Alternatively, the terminal may also multiplex the buffer amount corresponding to the target SRB and a buffer amount corresponding to at least one of the plurality of the RAN slices pre-configured for the terminal in the same target buffer report. Alternatively, the terminal may also indicate, in the target buffer report, a sum of the buffer amount corresponding to the target SRB and the buffer amount corresponding to the at least one RAN slice.

In this step, after generating the target buffer report, the terminal may report the target buffer report to the base station through a connection pre-established with the base station. The base station performs the resource configuration for the target SRB according to the method provided by the above examples.

For step 202, the terminal directly receives the resource configuration result from the base station.

For step 203, optionally, the terminal may determine the target RAN slice corresponding to the target SRB from among the plurality of the RAN slices according to contents indicated by the resource configuration result from the base station.

When the resource configuration result includes information on a RAN slice where a first target resource corresponding to the target SRB is located, the terminal may directly take the RAN slice indicated by the information as the target RAN slice.

When the resource configuration result includes the first target resource corresponding to the target SRB, the terminal queries a RAN slice where the first target resource is located from among the plurality of the RAN slices, and uses the RAN slice where the first target resource is located as the target RAN slice.

When the resource configuration result includes a second target resource shared by the target SRB and at least one of the plurality of the RAN slices, the terminal may allocate the second target resource to the target SRB. Therefore, the terminal may take a RAN slice where the second target resource is located as the target RAN slice for transmitting the target RRC message.

For step 204, after the terminal determines the target RAN slice, since the base station has configured corresponding target SRB for the target RAN slice, the terminal may transmit the target RRC message directly by the target SRB.

Through this process, the terminal can determine the corresponding target RAN slice according to the resource configuration result returned from the base station, and then transmit the target RRC message through the target RAN slice. A purpose of transmitting RRC messages through a plurality of RAN slices is achieved.

Figure 3:
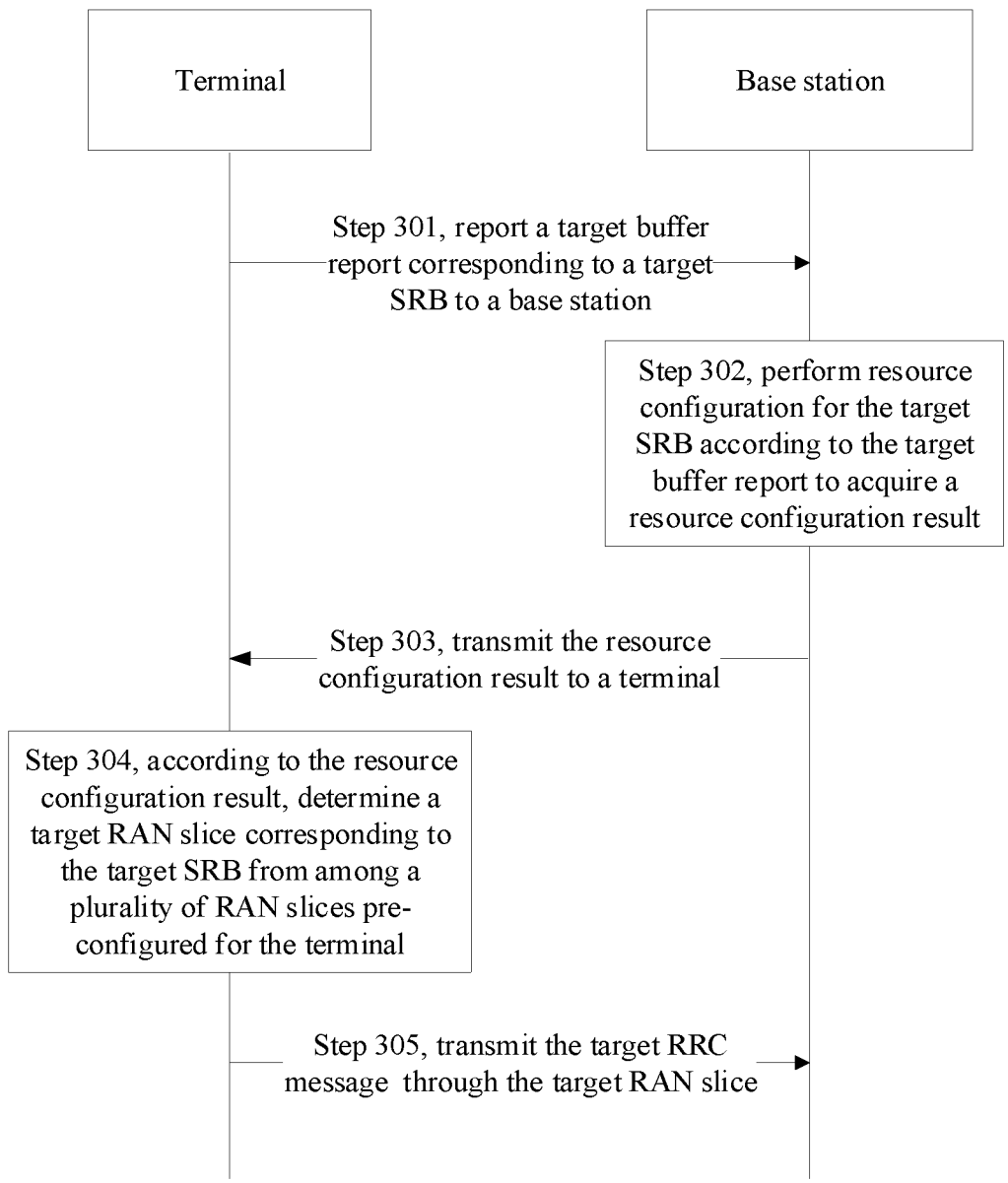
FIG. 3 is a flowchart illustrating another method of transmitting an RRC message according to an example.

FIG. 3 is a flowchart illustrating another method for transmitting an RRC message according to an example, which may include the following steps.

At step 301, a terminal reports a target buffer report corresponding to a target SRB to a base station.

The target buffer report indicates a buffer amount corresponding to the target SRB. Alternatively, the target buffer report indicates the buffer amount corresponding to the target SRB, and a buffer amount corresponding to at least one of a plurality of RAN slices pre-configured for the terminal. Alternatively, the target buffer report indicates a sum of the buffer amount corresponding to the target SRB and the buffer amount corresponding to the at least one of the plurality of the RAN slices pre-configured for the terminal.

At step 302, the base station performs resource configuration for the target SRB according to the target buffer report to acquire a resource configuration result.

At step 303, the base station transmits the resource configuration result to the terminal.

At step 304, according to the resource configuration result, the terminal determines a target RAN slice corresponding to the target SRB from among the plurality of the RAN slices pre-configured for the terminal.

At step 305, the terminal transmits the target RRC message through the target RAN slice.

Figure 4:
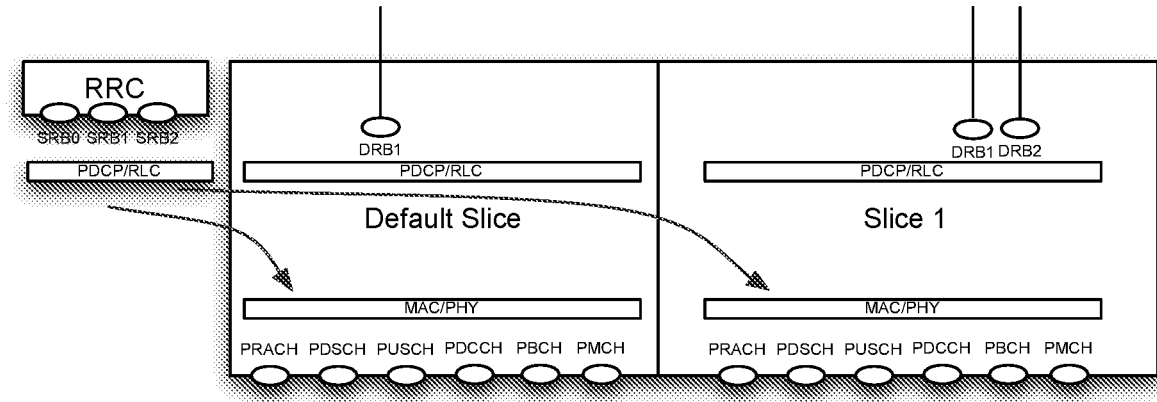
FIG. 4 is a schematic diagram illustrating a transmission scenario of an RRC message according to an example.

In the above examples, all SRBs do not belong to any RAN slice, and information on a RAN slice corresponding to an SRB is not included in a connection reconfiguration message transmitted by the base station. As shown in FIG. 4, the SRB may be mapped to any of the RAN slices, for example, to a default RAN slice or slice 1. A resource in the default RAN slice is a cell common resource. The terminal determines to map the target SRB to the target RAN slice according to the resource configuration result returned from the base station, so that the target RRC message may be transmitted through corresponding target SRB on the target RAN slice. Through this process, a purpose of transmitting the RRC messages through the plurality of the RAN slices is achieved.

Based on the above scenario, another manner may be adopted to achieve a purpose of transmitting RRC messages through a plurality of RAN slices. The manner is as follows.

In a second manner, a base station configures SRBs corresponding to different RAN slices for a terminal, and the terminal, after determining a target RAN slice, transmits a target RRC message through the target RAN slice based on a target SRB configured by the base station for the target RAN slice.

Figure 5:
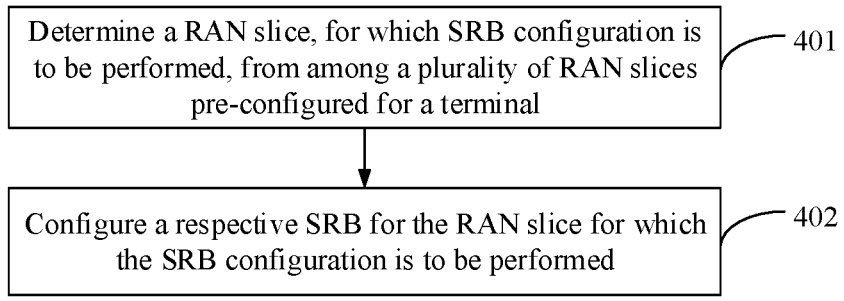
FIG. 5 is a flowchart illustrating another method of transmitting an RRC message according to an example.

In this manner, another method of transmitting an RRC message is provided by examples of the present disclosure, which may be applied to a base station. FIG. 5 is a flowchart illustrating a method of transmitting an RRC message according to an example, which may include the following steps.

At step 401, a RAN slice for which SRB configuration is to be performed is determined from among a plurality of RAN slices pre-configured for a terminal.

At step 402, a respective SRB is configured for the RAN slice for which the SRB configuration is to be performed, so that the terminal, determines a target RAN slice from among the plurality of RAN slices, and transmits a target RRC message through the target RAN slice based on a target SRB configured by the base station for the target RAN slice.

The target SRB is an SRB for transmitting the target RRC message.

In this example, the base station can first determine the RAN slice for which the SRB configuration is to be performed from among the plurality of the RAN slices pre-configured for the terminal, and further, the base station can configure the corresponding SRB respectively for each RAN slice for which the SRB configuration is to be performed, so that the terminal transmits the RRC messages through the plurality of the RAN slices.

For step 401, optionally, the plurality of the RAN slices may carry different services. For example, a video service is carried by RAN slice 1, and a health device monitoring service is carried by RAN slice 2.

The base station may take a RAN slice corresponding to a current service of the terminal as the RAN slice for which the SRB configuration is to be performed. For example, if the current service is the health device monitoring service, RAN slice 2 is the RAN slice for which the SRB configuration is to be performed.

Alternatively, in order to improve a transmission quality of an RRC message, the base station may also take each of the plurality of the RAN slices pre-configured for the terminal as the RAN slice for which the SRB configuration is to be performed.

For step 402, the base station may configure a respective SRB for the RAN slice for which the SRB configuration is to be performed. SRB0 does not need to be configured, and the terminal has this bearer by default. The base station may configure SRB1 and SRB2 respectively for each RAN slice for which the SRB configuration is to be performed. For example, if RAN slice 2 is to be configured with an SRB currently, the terminal configures only SRB1 and SRB2 for RAN slice 2.

Alternatively, to improve a transmission quality of an RRC message, the base station may take each of the plurality of the RAN slices as the RAN slice for which the SRB configuration is to be performed, thus, SRB1 and SRB2 are configured for each of the RAN slice.

Optionally, the base station may transmit the above configuration result to the terminal through a connection reconfiguration message later.

In this example, the base station may take the RAN slice corresponding to the current service of the terminal as the RAN slice for which the SRB configuration is to be performed, or take each of the plurality of the RAN slices pre-configured for the terminal as the RAN slice for which the SRB configuration is to be performed. Further, the base station configures the corresponding SRB for the RAN slice for which the SRB configuration is to be performed, so that the terminal may subsequently transmit RRC messages through the plurality of the RAN slices.

Figure 6:
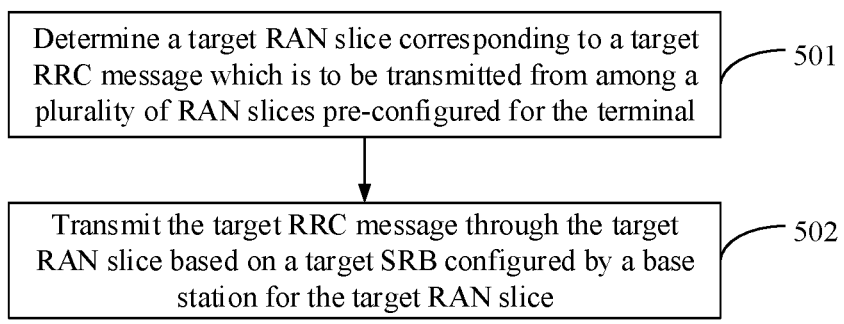
FIG. 6 is a flowchart illustrating another method of transmitting an RRC message according to an example.

In the manner of transmitting the RRC messages through the plurality of the RAN slices, corresponding to the RRC message transmission method on a base station side, another method of transmitting an RRC message is further provided by examples of the present disclosure, which may be applied to a terminal. FIG. 6 is a flowchart illustrating another method of transmitting an RRC message according to an example, which may include the following steps.

At step 501, a target RAN slice corresponding to a target RRC message which is to be transmitted is determined from among a plurality of RAN slices pre-configured for a terminal.

At step 502, the target RRC message is transmitted through the target RAN slice based on a target SRB configured by a base station for the target RAN slice.

In this example, the terminal may determine, from among the plurality of the RAN slices pre-configured for the terminal, the target RAN slice corresponding to the target RRC message, and the target RRC message is an RRC message which is to be transmitted by the terminal. Further, the terminal transmits the target RRC message through the target RAN slice based on the target SRB configured by the base station for the target RAN slice. Through this process, after determining the target RAN slice, the terminal may transmit the RRC message through the target RAN slice. Thus, a purpose of transmitting the RRC messages through the plurality of the RAN slices is achieved, and it is avoided an excessive impact caused by a separate RAN slice transmitting the RRC message and a problem of isolation between slices.

For step 501, in a first case, when each of cell signal qualities respectively on the plurality of the RAN slices is lower than a preset threshold, the terminal may take each of the plurality of the RAN slices as the target RAN slice for the target RRC message which is to be transmitted, that is, the target RRC message may be transmitted through all RAN slices. Thus, when the cell signal qualities are poor, a transmission quality of the RRC message is improved, and a purpose of transmitting the RRC message through the plurality of RAN slices is achieved.

Figure 7:
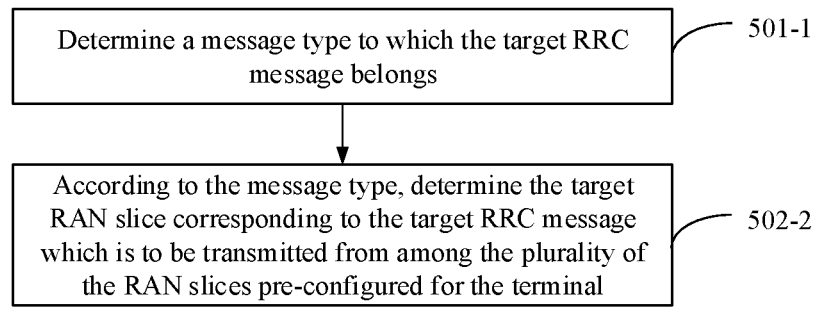
FIG. 7 is a flowchart illustrating another method of transmitting an RRC message according to an example.

In a second case, the terminal may determine the target RAN slice from among the plurality of the RAN slices according to a message type to which the target RRC message belongs. FIG. 7 is a flowchart illustrating another method of transmitting an RRC message according to the example shown in FIG. 6. As shown in FIG. 7, step 501 may include the following steps.

At step 501-1, a message type to which the target RRC message belongs is determined.

In examples of the present disclosure, if a target RRC message is for performing a common control function and does not include user data, the message type to which the target RRC message belongs is determined as a first message type. For example, a connection establishment related message, a connection release message, a connection reestablishment related message, a connection recovery related message, a measurement report, a security mode command/completion, a terminal information request/reply, a terminal assistance information message, and a terminal capability request/reply, when these messages, reports, commands, completion, requests, and replies do not include user data, they belongs to the first message type.

If a target RRC message carries the user data, according to a message content of the target RRC message, the message type to which the target RRC message belongs may be determined as the first message type or a second message type.

When a target RRC message is a connection reconfiguration message, if a message content is for configuring a RAN slice, the message type to which the target RRC message belongs is determined as the second message type, and if a message content is not for configuring a RAN slice, the message type to which the target RRC message belongs is determined as the first message type.

When a target RRC message is an uplink information transmission message or a downlink information transmission message, if a message content includes a common NAS message or it cannot be determined whether an NAS message belongs to the common NAS message, the message type to which the target RRC message belongs is determined as the first message type, and if the message content does not include the common NAS message, the message type to which the target RRC message belongs is determined as the second message type.

In examples of the present disclosure, the first message type may be configured to indicate a common RRC message, and the second message type may be configured to indicate a slice specific RRC message.

In addition, in examples of the present disclosure, it should be noted that when a base station side performs SRB configuration for a RAN slice, the SRB configuration may be performed only for some RAN slices. If a RAN slice does not have a corresponding SRB, where the RAN slice corresponding to a target RRC message determined as the second message type, that is, the base station does not configure a SRB for the RAN slice corresponding to the target RRC message, the message type to which the target RRC message belongs is re-determined as the first message type.

At step 501-2, according to the message type, the target RAN slice corresponding to the target RRC message which is to be transmitted is determined from among the plurality of the RAN slices pre-configured for the terminal.

At this step, when the message type is the first message type, the following two situations may be included.

In a first situation, if the target RRC message is not triggered by a service, the terminal may arbitrarily select a RAN slice as the target RAN slice from among the plurality of the RAN slices. Optionally, a RAN slice that meets a preset condition may be selected as the target RAN slice from among the plurality of the RAN slices. The preset condition includes the best channel quality and/or the lowest load.

In other words, if the target RRC message belongs to the first message type, e.g., the common RRC message, and the target RRC message is not triggered by the service, the terminal may select any of the plurality of the RAN slices pre-configured for the terminal as the target RAN slice. Optionally, the terminal takes a RAN slice with the best channel quality and/or the lowest load as the target RAN slice.

In a second situation, if the target RRC message is triggered by a service, a RAN slice corresponding to the service from among the plurality of the RAN slices is taken as the target RAN slice.

In this situation, if the target RRC message is triggered by the service, the terminal directly uses the RAN slice corresponding to the service as the target RAN slice.

When the message type is the second message type, the following two situations may be included.

In a first situation, if a number of RAN slices corresponding to the target RRC message is one, the RAN slice corresponding to the target RRC message is used as the target RAN slice.

In this situation, if the target RRC message is the slice specific RRC message and the target RRC message corresponds to only one RAN slice, the terminal directly uses the RAN slice corresponding to the target RRC message as the target RAN slice.

In a second situation, if there are multiple RAN slices corresponding to the target RRC message, a RAN slice that meets a preset condition is selected from among the multiple RAN slices corresponding to the target RRC message as the target RAN slice.

In this situation, if the target RRC message is the slice specific RRC message and there are multiple RAN slices corresponding to the target RRC message, the terminal may select any of the corresponding RAN slices as the target RAN slice. Optionally, a RAN slice with the best channel quality and/or the lowest load from among the RAN slices corresponding to the target RRC message may also be taken as the target RAN slice.

For step 502, after determining the target RAN slice in the above cases, based on the target SRB pre-configured by the base station for the target RAN slice, the terminal can transmit the target RRC message through the target RAN slice according to the related art.

In this example, the terminal may transmit the target RRC message through all RAN slices when the cell signal quality is poor, or after determining the target RAN slice from among the plurality of the RAN slices according to the message type to which the target RRC message belongs, the terminal may transmit the target RRC message through the target RAN slice. This process achieves a purpose of transmitting RRC messages through the plurality of the RAN slices.

Figure 8:
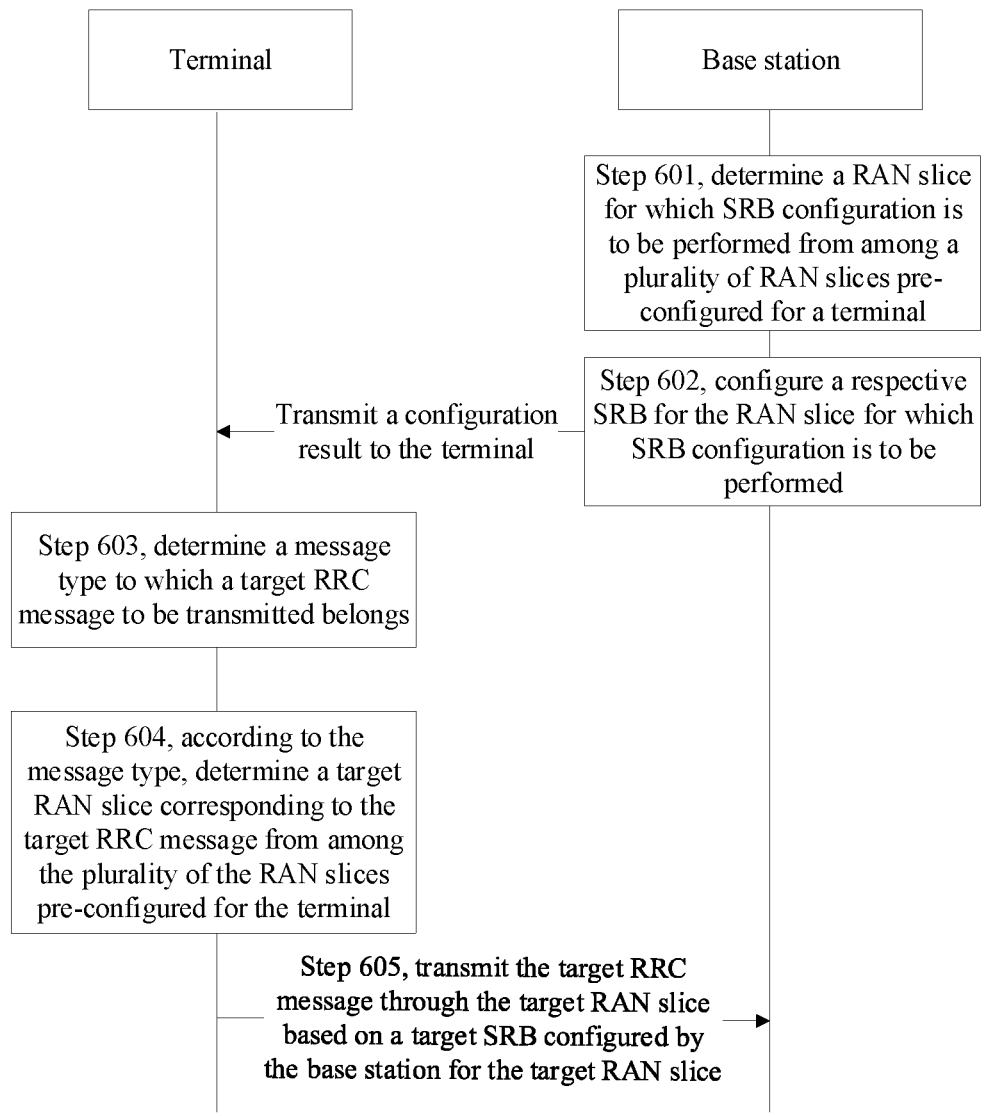
FIG. 8 is a flowchart illustrating another method of transmitting an RRC message according to an example.

FIG. 8 is a flowchart illustrating another method of transmitting an RRC message according to an example, which may include the following steps.

At step 601, a base station determines a RAN slice for which SRB configuration is to be performed from among a plurality of RAN slices pre-configured for a terminal.

At step 602, the base station configures a respective SRB for the RAN slice for which the SRB configuration is to be performed, and transmits a configuration result to the terminal.

At step 603, the terminal determines a message type to which a target RRC message to be transmitted belongs.

At step 604, according to the message type, the terminal determines a target RAN slice corresponding to the target RRC message from among the plurality of the RAN slices pre-configured for the terminal.

At step 605, the terminal transmits the target RRC message through the target RAN slice based on a target SRB configured by the base station for the target RAN slice.

Figure 9:
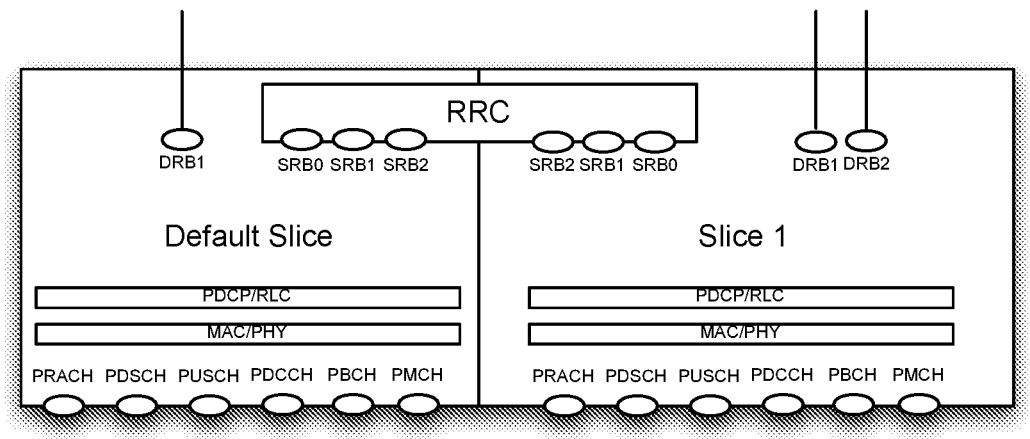
FIG. 9 is a schematic diagram illustrating another transmission scenario of an RRC message according to an example.

In this example, the RRC message transmitted by the SRB is classified into a first message type and a second message type. Further, for example, as shown in FIG. 9, a terminal may determine a target RAN slice from a plurality of RAN slices according to a message type to which a target RRC message belongs, so as to transmit the target RRC message based on a target SRB configured by a base station for the target RAN slice. That is, the target RRC message is transmitted through the target RAN slice. A purpose of transmitting RRC messages through the plurality of the RAN slices is achieved.

In the above examples, the base station may also configure an SRB for all RAN slices, so that the terminal may transmit the target RRC message through each RAN slice when a cell signal quality is poor. Thus, when the cell signal quality is poor, a transmission quality of the RRC message may be improved, and a purpose of transmitting the RRC message through the plurality of the RAN slices is achieved.

Corresponding to the above-described application function implementation method examples, the present disclosure also provides application function implementation apparatus and corresponding examples.

Figure 10:
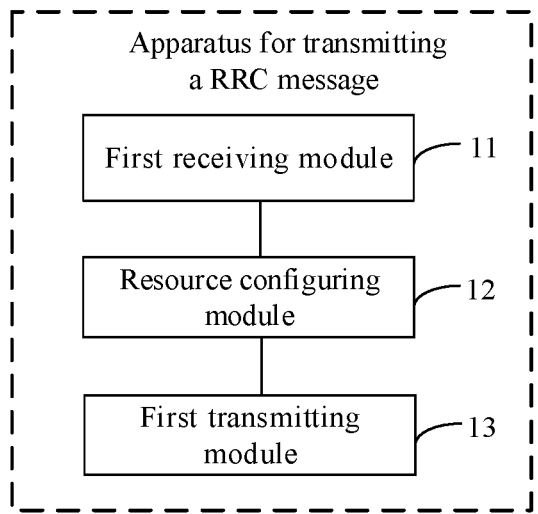
FIG. 10 is a block diagram illustrating an apparatus for transmitting an RRC message according to an example.

FIG. 10 is a block diagram illustrating an apparatus for transmitting an RRC message according to an example, which may be applied to a base station and includes:

a first receiving module 11 configured to receive a target buffer report corresponding to a target SRB which is reported by a terminal, where the target SRB is an SRB for transmitting a target RRC message which is to be transmitted by the terminal;

a resource configuring module 12 configured to perform resource configuration for the target SRB according to the target buffer report to acquire a resource configuration result; and a first transmitting module 13 configured to transmit the resource configuration result to the terminal, so that the terminal determines, according to the resource configuration result, a target RAN slice corresponding to the target SRB from among a plurality of RAN slices pre-configured for the terminal and transmits the target RRC message through the target RAN slice.

Optionally, the target buffer report indicates a buffer amount corresponding to the target SRB; or the target buffer report indicates the buffer amount corresponding to the target SRB and a buffer amount corresponding to at least one of the plurality of the RAN slices pre-configured for the terminal.

Figure 11:
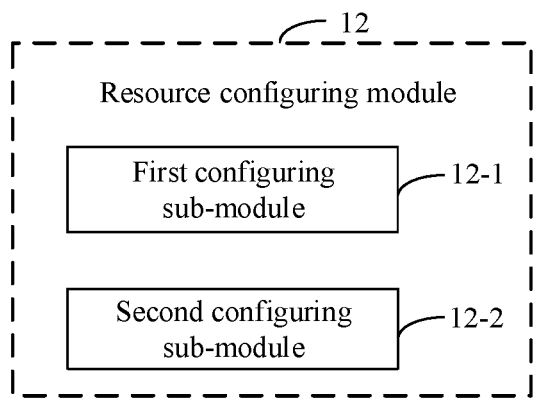
FIG. 11 is a block diagram illustrating another apparatus for transmitting an RRC message according to an example.

Correspondingly, FIG. 11 is a block diagram illustrating another apparatus for transmitting an RRC message according to an example. On the basis of the example shown in FIG. 10, the resource configuring module 12 includes any of the following sub-modules:

a first configuring sub-module 12-1 configured to acquire, according to the buffer amount corresponding to the target SRB which is indicated in the target buffer report, the resource configuration result that comprises information on a RAN slice where a first target resource corresponding to the target SRB is located; and a second configuring sub-module 12-2 configured to perform the resource configuration according to the buffer amount corresponding to the target SRB which is indicated in the target buffer report, so as to acquire the resource configuration result that comprises the first target resource corresponding to the target SRB.

Optionally, the target buffer report indicates a sum of a buffer amount corresponding to the target SRB and a buffer amount corresponding to at least one of the plurality of the RAN slices pre-configured for the terminal.

Figure 12:
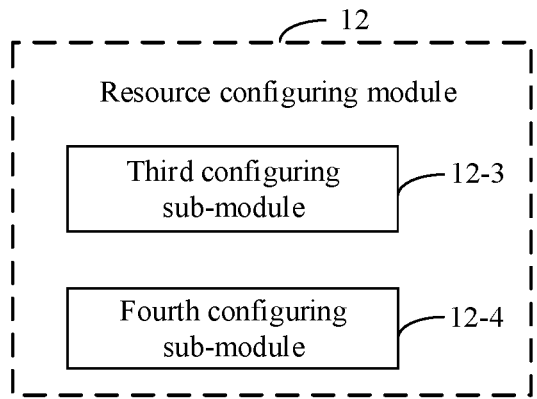
FIG. 12 is a block diagram illustrating another apparatus for transmitting an RRC message according to an example.

Correspondingly, FIG. 12 is a block diagram illustrating another apparatus for transmitting an RRC message according to an example. On the basis of the example shown in FIG. 10, the resource configuring module 12 includes any of the following sub-modules:

a third configuring sub-module 12-3 configured to perform, according to the sum of the buffer amounts indicated in the target buffer report, the resource configuration for the target SRB and the at least one of the plurality of the RAN slices pre-configured for the terminal, so as to acquire the resource configuration result that comprises a second target resource which is shared by the target SRB and the at least one RAN slice; and a fourth configuring sub-module 12-4 configured to take slice information on a predefined RAN slice that provides a resource service for the terminal as information on a RAN slice where a first target resource corresponding to the target SRB is located, so as to acquire the resource configuration result that comprises the information on the RAN slice where the first target resource is located.

Figure 13:
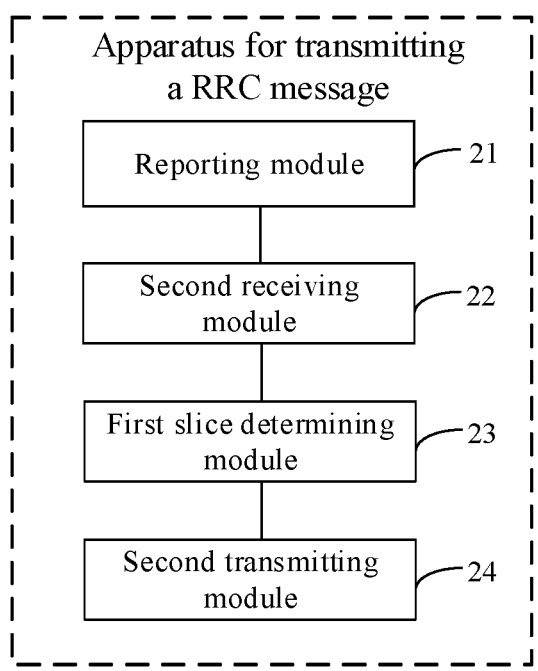
FIG. 13 is a block diagram illustrating another apparatus for transmitting an RRC message according to an example.

FIG. 13 is a block diagram illustrating another apparatus for transmitting an RRC message according to an example, which may be applied to a terminal and includes:

a reporting module 21 configured to report a target buffer report corresponding to a target SRB to a base station, wherein the target SRB is an SRB for transmitting a target RRC message which is to be transmitted by the terminal;

a second receiving module 22 configured to receive, from the base station, a resource configuration result associated with resource configuration performed for the target SRB according to the target buffer report;

a first slice determining module 23 configured to determine, according to the resource configuration result, a target RAN slice corresponding to the target SRB from among a plurality of RAN slices pre-configured for the terminal; and a second transmitting module 24 configured to transmit the target RRC message through the target RAN slice.

Optionally, the target buffer report indicates a buffer amount corresponding to the target SRB; or the target buffer report indicates the buffer amount corresponding to the target SRB, and a buffer amount corresponding to at least one of the plurality of the RAN slices pre-configured for the terminal; or the target buffer report indicates a sum of the buffer amount corresponding to the target SRB and the buffer amount corresponding to the at least one of the plurality of the RAN slices pre-configured for the terminal.

Figure 14:
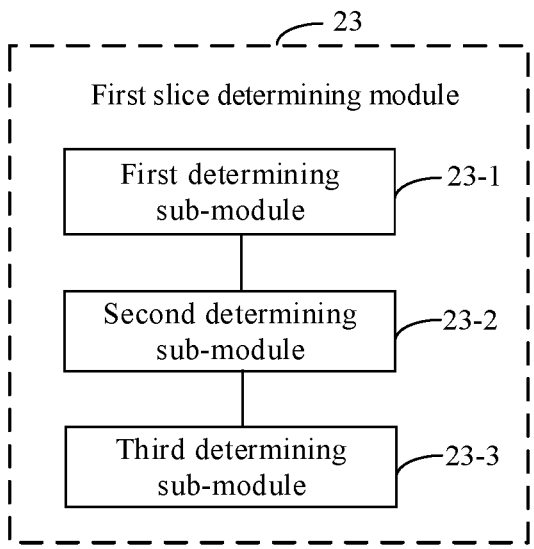
FIG. 14 is a block diagram illustrating another apparatus for transmitting an RRC message according to an example.

FIG. 14 is a block diagram illustrating another apparatus for transmitting an RRC message according to an example. On the basis of the example shown in FIG. 13, the first slice determining module 23 includes:

a first determining sub-module 23-1 configured to, when the resource configuration result comprises information on a RAN slice where a first target resource corresponding to the target SRB is located, take the RAN slice indicated by the information as the target RAN slice;

a second determining sub-module 23-2 configured to, when the resource configuration result comprises the first target resource corresponding to the target SRB, take a RAN slice, where the first target resource is located, from among the plurality of the RAN slices as the target RAN slice; and a third determining sub-module 23-3 configured to, when the resource configuration result comprises a second target resource shared by the target SRB and at least one of the plurality of the RAN slices, take a RAN slice, where the second target resource is located, from among the plurality of the RAN slices as the target RAN slice.

Figure 15:
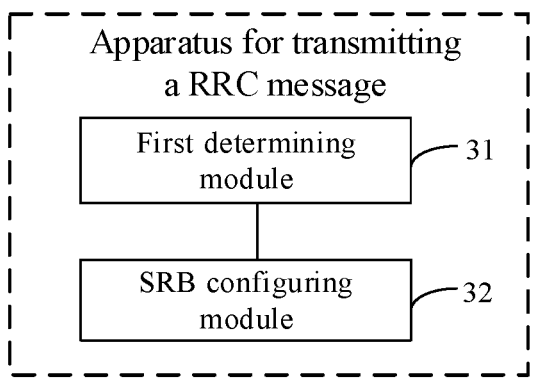
FIG. 15 is a block diagram illustrating another apparatus for transmitting an RRC message according to an example.

FIG. 15 is a block diagram illustrating another apparatus for transmitting an RRC message according to an example, which may be applied to a base station and includes:

a first determining module 31 configured to determine a RAN slice, for which SRB configuration is to be performed, from among a plurality of RAN slices pre-configured for a terminal; and an SRB configuring module 32 configured to configure a respective SRB for the RAN slice for which the SRB configuration is to be performed, so that the terminal determines a target RAN slice from among the plurality of the RAN slices, and transmits a target RRC message through the target RAN slice based on a target SRB configured by the base station for the target RAN slice.

The target SRB is an SRB for transmitting the target RRC message.

Figure 16:
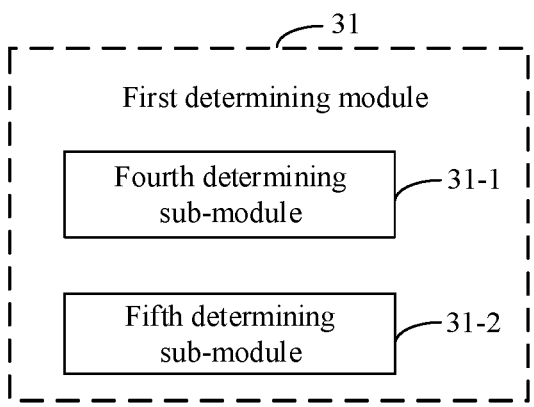
FIG. 16 is a block diagram illustrating another apparatus for transmitting an RRC message according to an example.

FIG. 16 is a block diagram illustrating another apparatus for transmitting an RRC message according to an example. On the basis of the example shown in FIG. 15, the first determining module 31 includes any of the following sub-modules:

a fourth determining sub-module 31-1 configured to take a RAN slice, corresponding to a current service of the terminal, from among the plurality of the RAN slices pre-configured for the terminal as the RAN slice for which the SRB configuration is to be performed; and a fifth determining sub-module 31-2 configured to take each of the plurality of the RAN slices as the RAN slice for which the SRB configuration is to be performed.

Figure 17:
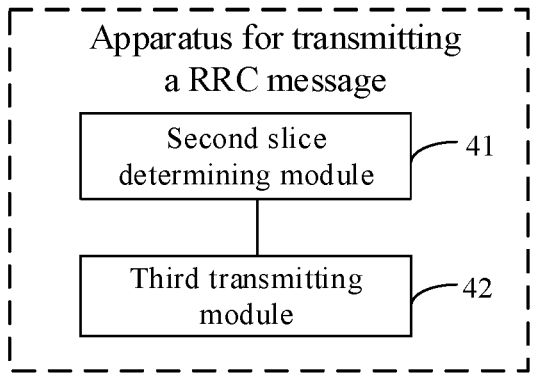
FIG. 17 is a block diagram illustrating another apparatus for transmitting an RRC message according to an example.

FIG. 17 is a block diagram illustrating another apparatus for transmitting an RRC message according to an example, which may be applied to a terminal and includes:

a second slice determining module 41 configured to determine a target RAN slice corresponding to a target RRC message which is to be transmitted from among a plurality of RAN slices pre-configured for the terminal; and a third transmitting module 42 configured to transmit the target RRC message through the target RAN slice based on a target SRB configured by a base station for the target RAN slice.

Figure 18:
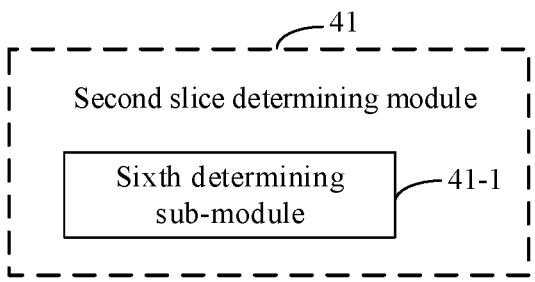
FIG. 18 is a block diagram illustrating another apparatus for transmitting an RRC message according to an example.

FIG. 18 is a block diagram illustrating another apparatus for transmitting an RRC message according to an example. On the basis of the example shown in FIG. 17, the second slice determining module 41 includes:

a sixth determining sub-module 41-1 configured to, when each of cell signal qualities of the terminal respectively on the plurality of the RAN slices is lower than a preset threshold, take each of the plurality of the RAN slices as the target RAN slice.

Figure 19:
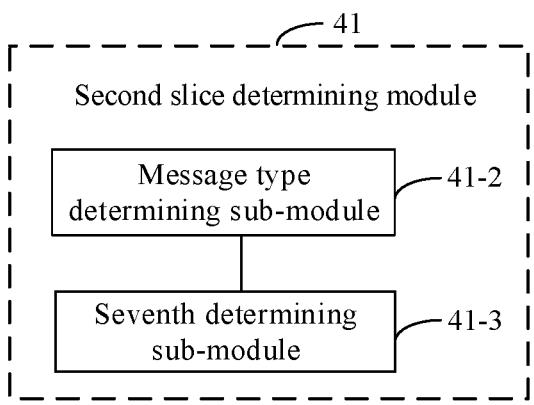
FIG. 19 is a block diagram illustrating another apparatus for transmitting an RRC message according to an example.

FIG. 19 is a block diagram illustrating another apparatus for transmitting an RRC message according to an example. On the basis of the example shown in FIG. 17, the second slice determining module 41 includes:

a message type determining sub-module 41-2 configured to determine a message type to which the target RRC message belongs; and a seventh determining sub-module 41-3 configured to determine, according to the message type, the target RAN slice corresponding to the target RRC message which is to be transmitted from among the plurality of the RAN slices pre-configured for the terminal.

Figure 20:
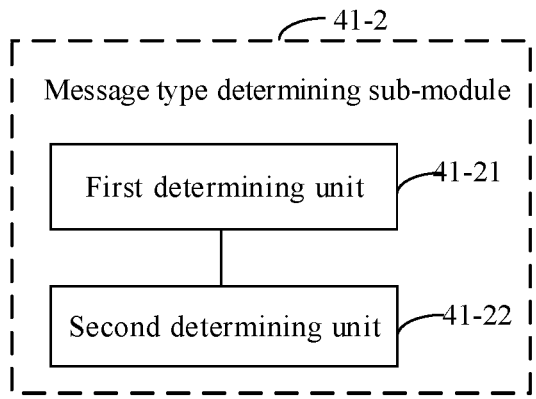
FIG. 20 is a block diagram illustrating another apparatus for transmitting an RRC message according to an example.

FIG. 20 is a block diagram illustrating another apparatus for transmitting an RRC message according to an example. On the basis of the example shown in FIG. 19, the message type determining sub-module 41-2 includes:

a first determining unit 41-21 configured to, when the target RRC message is for performing a common control function and does not carry user data, determine that the message type to which the target RRC message belongs is a first message type; and a second determining unit 41-22 configured to, when the target RRC message carries the user data, determine that the message type to which the target RRC message belongs is the first message type or a second message type according to a message content of the target RRC message.

Figure 21:
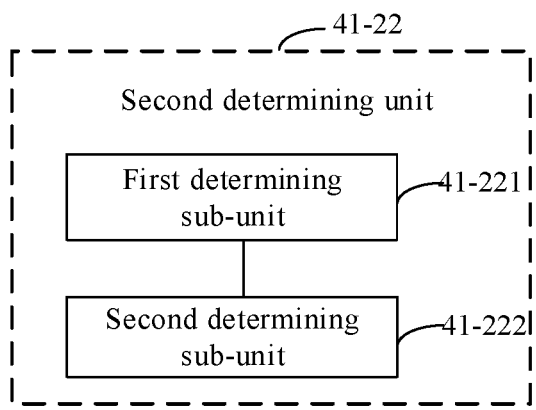
FIG. 21 is a block diagram illustrating another apparatus for transmitting an RRC message according to an example.

FIG. 21 is a block diagram illustrating another apparatus for transmitting an RRC message according to an example. On the basis of the example shown in FIG. 20, the second determining unit 41-22 includes:

a first determining sub-unit 41-221 configured to, when the target RRC message is a connection reconfiguration message, while the message content is for configuring the RAN slice, determine that the message type to which the target RRC message belongs is the second message type, and while the message content is not for configuring the RAN slice, determine that the message type to which the target RRC message belongs is the first message type; and a second determining sub-unit 41-222 configured to, when the target RRC message is an uplink information transmission message or a downlink information transmission message, while the message content comprises a common NAS message or it cannot be determined whether an NAS message belongs to the common NAS message, determine that the message type to which the target RRC message belongs is the first message type, and while the message content does not comprise the common NAS message, determine that the message type to which the target RRC message belongs is the second message type.

Figure 22:
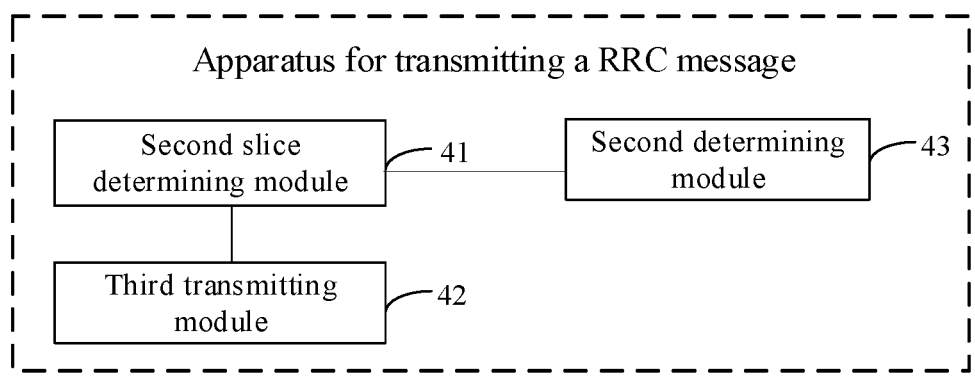
FIG. 22 is a block diagram illustrating another apparatus for transmitting an RRC message according to an example.

FIG. 22 is a block diagram illustrating another apparatus for transmitting an RRC message according to an example. On the basis of the example shown in FIG. 21, the apparatus further includes:

a second determining module 43 configured to, when the message type to which the target RRC message belongs is the second message type, while the base station does not perform SRB configuration for a RAN slice corresponding to the target RRC message, re-determine that the message type to which the target RRC message belongs is the first message type.

Figure 23:
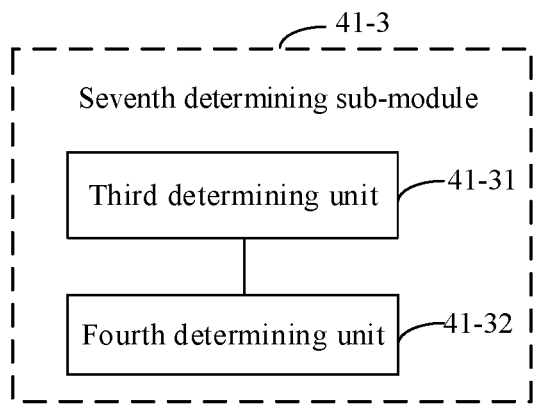
FIG. 23 is a block diagram illustrating another apparatus for transmitting an RRC message according to an example.

FIG. 23 is a block diagram illustrating another apparatus for transmitting an RRC message according to an example. On the basis of the example shown in FIG. 20, the seventh determining sub-module 41-3 includes:

a third determining unit 41-31 configured to, when the message type is the first message type, while the target RRC message is not triggered by a service, select a RAN slice that meets a preset condition from among the plurality of the RAN slices as the target RAN slice; and a fourth determining unit 41-32 configured to, when the message type is the first message type, while the target RRC message is triggered by the service, take a RAN slice corresponding to the service from among the plurality of the RAN slices as the target RAN slice.

Figure 24:
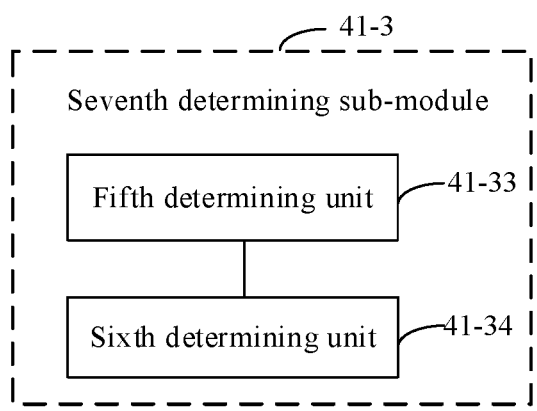
FIG. 24 is a block diagram illustrating another apparatus for transmitting an RRC message according to an example.

FIG. 24 is a block diagram illustrating another apparatus for transmitting an RRC message according to an example. On the basis of the example shown in FIG. 20, the seventh determining sub-module 41-3 includes:

a fifth determining unit 41-33 configured to, when the message type is the second message type, while a number of RAN slices corresponding to the target RRC message is one, take a RAN slice corresponding to the target RRC message as the target RAN slice; and a sixth determining unit 41-34 configured to, when the message type is the second message type, while the number of the RAN slices corresponding to the target RRC message is more than one, select one RAN slice that meets a preset condition from among the RAN slices corresponding to the target RRC message as the target RAN slice.

Optionally, the preset condition includes a best channel quality and/or a lowest load.

With respect to the apparatuses in the above examples, the specific manners in which respective modules perform operations have been described in detail in the method examples, and will not be explained in detail here.

Correspondingly, an example of the present disclosure further provides a computer-readable storage medium storing a computer program for performing any of methods of transmitting an RRC message applied to a base station side in the first manner as described above.

Correspondingly, an example of the present disclosure further provides a computer-readable storage medium storing a computer program for performing any of methods of transmitting an RRC message applied to a terminal side in the first manner as described above.

Correspondingly, an example of the present disclosure further provides a computer-readable storage medium storing a computer program for performing any of methods of transmitting an RRC message applied to a base station side in the second manner as described above.

Correspondingly, an example of the present disclosure further provides a computer-readable storage medium storing a computer program for performing any of methods of transmitting an RRC message applied to a terminal side in the second manner as described above.

Correspondingly, an example of the present disclosure further provides an apparatus for transmitting an RRC message, which is applied to a base station, and includes:
 a processor; and
 a memory storing instructions executable by the processor,
 wherein the processor is configured to:
 receive a target buffer report corresponding to a target SRB which is reported by a terminal, wherein the target SRB is an SRB for transmitting a target RRC message which is to be transmitted by the terminal;
 perform resource configuration for the target SRB according to the target buffer report to acquire a resource configuration result; and
 transmit the resource configuration result to the terminal, so that the terminal determines, according to the resource configuration result, a target RAN slice corresponding to the target SRB from among a plurality of RAN slices pre-configured for the terminal, and transmits the target RRC message through the target RAN slice.

Correspondingly, an example of the present disclosure further provides an apparatus for transmitting an RRC message, which is applied to a terminal, and includes:
 a processor; and
 a memory storing instructions executable by the processor,
 wherein the processor is configured to:
 report a target buffer report corresponding to a target SRB to a base station, wherein the target SRB is an SRB for transmitting a target RRC message which is to be transmitted by the terminal;
 receive, from the base station, a resource configuration result associated with resource configuration performed for the target SRB according to the target buffer report;
 according to the resource configuration result, determine a target RAN slice corresponding to the target SRB from among a plurality of RAN slices pre-configured for the terminal; and
 transmit the target RRC message through the target RAN slice.

Correspondingly, an example of the present disclosure further provides an apparatus for transmitting an RRC message, which is applied to a base station, and includes:
 a processor; and
 a memory storing instructions executable by the processor,
 wherein the processor is configured to:
 determine a RAN slice, for which SRB configuration is to be performed, from among a plurality of RAN slices pre-configured for a terminal; and
 configure a respective SRB for the RAN slice for which the SRB configuration is to be performed, so that the terminal determines a target RAN slice from among the plurality of the RAN slices, and transmits a target RRC message through the target RAN slice based on a target SRB configured by the base station for the target RAN slice,
 wherein the target SRB is an SRB for transmitting the target RRC message.

Correspondingly, an example of the present disclosure further provides an apparatus for transmitting an RRC message, which is applied to a terminal, and includes:
 a processor; and
 a memory storing instructions executable by the processor,
 wherein the processor is configured to:
 determine a target RAN slice corresponding to a target RRC message which is to be transmitted from among a plurality of RAN slices pre-configured for the terminal; and
 transmit the target RRC message through the target RAN slice based on a target SRB configured by a base station for the target RAN slice.

Figure 25:
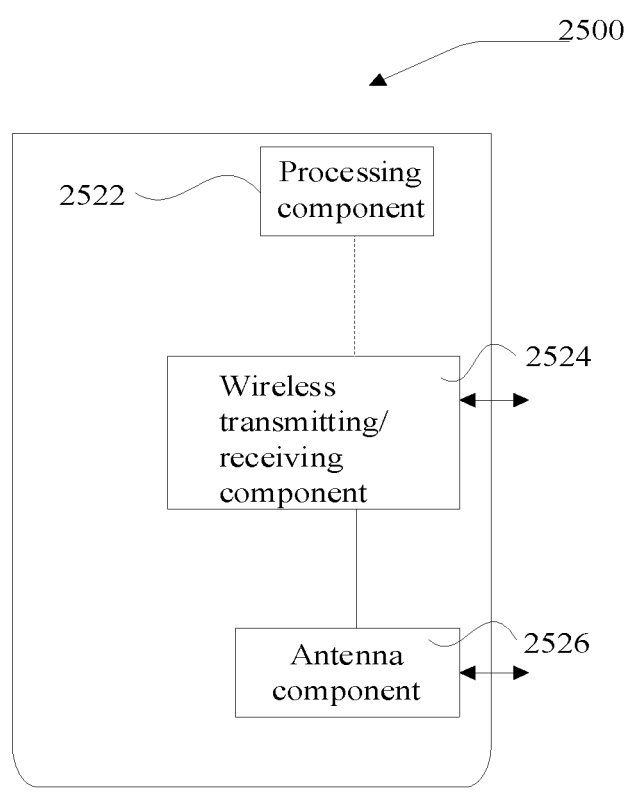
FIG. 25 is a structural diagram illustrating an apparatus for transmitting an RRC message according to an example of the present disclosure.

FIG. 25 is a structural diagram illustrating an apparatus 2500 for transmitting an RRC message according to an example. The apparatus 2500 may be provided as a base station. Referring to FIG. 25, the apparatus 2500 includes a processing component 2522, a wireless transmitting/receiving component 2524, an antenna component 2526, and a signal processing portion specific to a wireless interface. The processing component 2522 may further include one or more processors.

One of the processors in the processing component 2522 may be configured to perform any of methods for transmitting an RRC message applied to the base station side.

Figure 26:
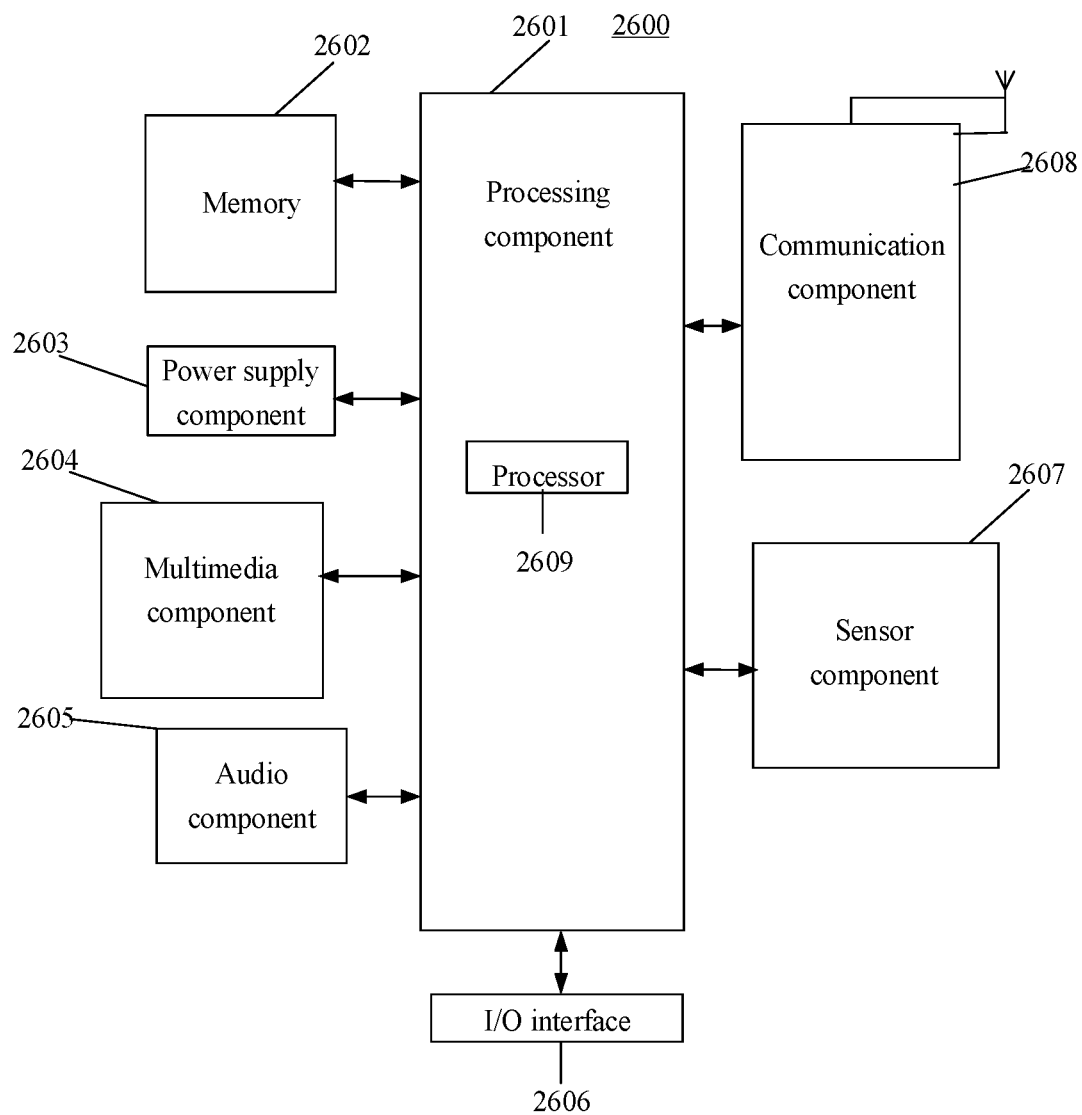
FIG. 26 is a structural diagram illustrating another apparatus for transmitting an RRC message according to an example of the present disclosure.

FIG. 26 is a structural diagram illustrating an apparatus for transmitting an RRC message according to an example. As shown in FIG. 26, an apparatus 2600 for transmitting an RRC message according to an example may be a terminal.

Referring to FIG. 26, the apparatus 2600 may include one or more of the following components: a processing component 2601, a memory 2602, a power component 2603, a multimedia component 2604, an audio component 2605, an input/output (I/O) interface 2606, a sensor component 2607, and a communication component 2608.

The processing component 2601 usually controls the overall operation of the apparatus 2600, such as operations associated with display, telephone calls, data communications, camera operations, and recording operations. The processing component 2601 may include one or more processors 2609 to execute instructions to perform all or part of the steps in the methods described above. Moreover, the processing component 2601 may include one or more modules to facilitate interaction between the processing component 2601 and other components. For example, the processing component 2601 may include a multimedia module to facilitate interaction between the multimedia component 2604 and the processing component 2601.

The memory 2602 is configured to store various types of data to support operation at the apparatus 2600. Examples of these data include instructions for any application or method operating at the apparatus 2600, contact data, phone book data, messages, pictures, videos, and the like. The memory 2602 may be implemented by any type of volatile or non-volatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a disk or a compact disk.

The power component 2603 supplies power to various components of the apparatus 2600. The power component 2603 may include a power management system, one or more power sources, and other components associated with power generated, managed, and distributed for the apparatus 2600.

The multimedia component 2604 includes a screen that provides an output interface between the apparatus 2600 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2604 includes a front camera and/or a rear camera. When the apparatus 2600 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2605 is configured to output and/or input audio signals. For example, the audio component 2605 includes a microphone (MIC) configured to receive an external audio signal when the apparatus 2600 is in an operation mode, such as a call mode, a recording mode, and a voice recognition mode. The received audio signal may be further stored in the memory 2602 or transmitted via the communication component 2608. In some examples, the audio component 2605 also includes a loudspeaker for outputting an audio signal.

The I/O interface 2606 provides an interface between the processing component 2601 and a peripheral interface module which may be a keyboard, a click wheel, a button, or the like. These buttons may include, but are not limited to a home button, a volume button, a start button, and a lock button.

The sensor component 2607 includes one or more sensors for providing a status assessment in various aspects to the apparatus 2600. For example, the sensor component 2607 may detect an open/closed state of the apparatus 2600, and the relative positioning of components, for example, the component is a display and a keypad of the apparatus 2600. The sensor component 2607 may also detect a change in position of the apparatus 2600 or a component of the apparatus 2600, the presence or absence of a user in contact with the apparatus 2600, the orientation or acceleration/deceleration of the apparatus 2600 and a change in temperature of the apparatus 2600. The sensor component 2607 may include a proximity sensor configured to detect the presence of nearby objects without any physical contact. The sensor component 2607 may also include a light sensor, such as a CMOS or CCD image sensor, for use in imaging applications. In some examples, the sensor component 2607 may also include an acceleration sensor, a gyro sensor, a magnetic sensor, a pressure sensor, or a temperature sensor.

The communication component 2608 is configured to facilitate wired or wireless communication between the apparatus 2600 and other devices. The apparatus 2600 may access a wireless network based on a communication standard, such as Wi-Fi, 2G or 3G, or a combination thereof. In an example, the communication component 2608 receives broadcast signals or broadcast associated information from an external broadcast management system via a broadcast channel. In an example, the communication component 2608 also includes a Near Field Communication (NFC) module to facilitate short range communication. For example, the NFC module may be implemented based on a Radio Frequency IDentification (RFID) technology, an Infrared Data Association (IrDA) technology, an Ultra-Wide Band (UWB) technology, a Bluetooth (BT) technology, and other technologies.

In an example, the apparatus 2600 may be implemented by one or more Application Specific Integrated Circuits (ASICs), Digital Signal Processors (DSPs), Digital Signal Processing Devices (DSPDs), Programmable Logic Devices (PLDs), a Field Programmable Gate Array (FPGA), a controller, a microcontroller, a microprocessor or other electronic elements for performing the above methods.

In an example, there is also provided a non-transitory computer readable storage medium comprising instructions, such as a memory 2602 comprising instructions, wherein the instructions are executable by the processor 2609 of the apparatus 2600 to perform the method as described above. For example, the non-transitory computer readable storage medium may be a ROM, a Random-Access Memory (RAM), a CD-ROM, a magnetic tape, a floppy disk, and an optical data storage device.

When the instructions in the storage medium are executed by the processor, the apparatus 2600 is enabled to perform any of methods for transmitting an RRC message applied to a terminal side as described above.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:
1. A method of transmitting an RRC message, being applied to a terminal and comprising:
  reporting a target buffer report corresponding to a target SRB to a base station, wherein the target SRB is an SRB for transmitting a target RRC message which is to be transmitted by the terminal;

receiving, from the base station, a resource configuration result associated with resource configuration performed for the target SRB according to the target buffer report, wherein the resource configuration result comprises information associated with a target RAN slice corresponding to the target SRB;

according to the resource configuration result, determining the target RAN slice corresponding to the target SRB from among a plurality of RAN slices pre-configured for the terminal; and transmitting the target RRC message through the target RAN slice;

wherein said according to the resource configuration result, determining the target RAN slice corresponding to the target SRB from among the plurality of the RAN slices pre-configured for the terminal comprises:

when the resource configuration result comprises information on a RAN slice where a first target resource corresponding to the target SRB is located, taking the RAN slice indicated by the information as the target RAN slice;

when the resource configuration result comprises the first target resource corresponding to the target SRB, taking a RAN slice, where the first target resource is located, from among the plurality of the RAN slices as the target RAN slice; and when the resource configuration result comprises a second target resource shared by the target SRB and at least one of the plurality of the RAN slices, taking a RAN slice, where the second target resource is located, from among the plurality of the RAN slices as the target RAN slice.

2. The method according to claim 1, wherein the target buffer report indicates a buffer amount corresponding to the target SRB; or the target buffer report indicates the buffer amount corresponding to the target SRB, and a buffer amount corresponding to at least one of the plurality of the RAN slices pre-configured for the terminal; or the target buffer report indicates a sum of the buffer amount corresponding to the target SRB and the buffer amount corresponding to the at least one of the plurality of the RAN slices pre-configured for the terminal.

3. A method of transmitting an RRC message, being applied to a terminal and comprising:

determining a target RAN slice corresponding to a target RRC message which is to be transmitted from among a plurality of RAN slices pre-configured for the terminal; and transmitting the target RRC message through the target RAN slice based on a target SRB configured by a base station for the target RAN slice;

wherein determining the target RAN slice corresponding to the target RRC message which is to be transmitted from among the plurality of the RAN slices pre-configured for the terminal comprises:

determining a message type to which the target RRC message belongs; and according to the message type, determining the target RAN slice corresponding to the target RRC message which is to be transmitted from among the plurality of the RAN slices pre-configured for the terminal.

4. The method according to claim 3, wherein determining the target RAN slice corresponding to the target RRC message which is to be transmitted from among the plurality of the RAN slices pre-configured for the terminal further comprises:

when each of cell signal qualities of the terminal respectively on the plurality of the RAN slices is lower than a preset threshold, taking each of the plurality of the RAN slices as the target RAN slice.

5. The method according to claim 3, wherein determining the message type to which the target RRC message belongs comprises:

when the target RRC message is for performing a common control function and does not carry user data, determining that the message type to which the target RRC message belongs is a first message type; and when the target RRC message carries the user data, determining that the message type to which the target RRC message belongs is the first message type or a second message type according to a message content of the target RRC message.

6. The method according to claim 5, wherein determining that the message type to which the target RRC message belongs is the first message type or the second message type according to the message content of the target RRC message comprises:

when the target RRC message is a connection reconfiguration message, while the message content is for configuring the RAN slice, determining that the message type to which the target RRC message belongs is the second message type, and while the message content is not for configuring the RAN slice, determining that the message type to which the target RRC message belongs is the first message type; and when the target RRC message is an uplink information transmission message or a downlink information transmission message, while the message content comprises a common Network Attached Storage (NAS) message or it cannot be determined whether an NAS message belongs to the common NAS message, determining that the message type to which the target RRC message belongs is the first message type, and while the message content does not comprise the common NAS message, determining that the message type to which the target RRC message belongs is the second message type.

7. The method according to claim 6, further comprising:

when the message type to which the target RRC message belongs is the second message type, while the base station does not perform SRB configuration for a RAN slice corresponding to the target RRC message, re-determining that the message type to which the target RRC message belongs is the first message type.

8. The method according to claim 5, wherein, when the message type is the first message type, determining the target RAN slice corresponding to the target RRC message which is to be transmitted from among the plurality of the RAN slices pre-configured for the terminal according to the message type comprises:

when the target RRC message is not triggered by a service, selecting a RAN slice that meets a preset condition from among the plurality of the RAN slices as the target RAN slice; and when the target RRC message is triggered by the service, taking a RAN slice corresponding to the service from among the plurality of the RAN slices as the target RAN slice.

9. The method according to claim 5, wherein, when the message type is the second message type, determining the target RAN slice corresponding to the target RRC message which is to be transmitted from among the plurality of the RAN slices pre-configured for the terminal according to the message type comprises:

when a number of RAN slices corresponding to the target RRC message is one, taking a RAN slice corresponding to the target RRC message as the target RAN slice; and when the number of the RAN slices corresponding to the target RRC message is more than one, selecting one RAN slice that meets a preset condition from among the RAN slices corresponding to the target RRC message as the target RAN slice.

10. The method according to claim 8, wherein the preset condition comprises a best channel quality and/or a lowest load.

11. An apparatus for transmitting an RRC message, being applied to a terminal and comprising:

a processor; and a memory storing instructions executable by the processor, wherein the processor is configured to:

report a target buffer report corresponding to a target SRB to a base station, wherein the target SRB is an SRB for transmitting a target RRC message which is to be transmitted by the terminal;

receive, from the base station, a resource configuration result associated with resource configuration performed for the target SRB according to the target buffer report, wherein the resource configuration result comprises information associated with a target RAN slice corresponding to the target SRB;

according to the resource configuration result, determine the target RAN slice corresponding to the target SRB from among a plurality of RAN slices pre-configured for the terminal; and transmit the target RRC message through the target RAN slice;

wherein the target buffer report indicates a buffer amount corresponding to the target SRB; or the target buffer report indicates the buffer amount corresponding to the target SRB, and a buffer amount corresponding to at least one of the plurality of the RAN slices pre-configured for the terminal; or the target buffer report indicates a sum of the buffer amount corresponding to the target SRB and the buffer amount corresponding to the at least one of the plurality of the RAN slices pre-configured for the terminal.

12. The apparatus according to claim 11, wherein the determining the target RAN slice corresponding to the target SRB from among the plurality of the RAN slices pre-configured for the terminal according to the resource configuration result comprises:

in a case that the resource configuration result comprises information on a RAN slice where a first target resource corresponding to the target SRB is located, taking the RAN slice indicated by the information as the target RAN slice;

in a case that the resource configuration result comprises the first target resource corresponding to the target SRB, taking a RAN slice, where the first target resource is located, from among the plurality of the RAN slices as the target RAN slice; and in a case that the resource configuration result comprises a second target resource shared by the target SRB and at least one of the plurality of the RAN slices, taking a RAN slice, where the second target resource is located, from among the plurality of the RAN slices as the target RAN slice.

13. An apparatus for transmitting an RRC message, being applied to a terminal and comprising:

a processor; and a memory storing instructions executable by the processor, wherein the processor is configured to:

determine a target RAN slice corresponding to a target RRC message which is to be transmitted from among a plurality of RAN slices pre-configured for the terminal; and transmit the target RRC message through the target RAN slice based on a target SRB configured by a base station for the target RAN slice;

wherein determining the target RAN slice corresponding to the target RRC message which is to be transmitted from among the plurality of the RAN slices pre-configured for the terminal comprises:

determining a message type to which the target RRC message belongs; and according to the message type, determining the target RAN slice corresponding to the target RRC message which is to be transmitted from among the plurality of the RAN slices pre-configured for the terminal.

14. The apparatus according to claim 13, wherein the determining the target RAN slice corresponding to the target RRC message which is to be transmitted from among the plurality of the RAN slices pre-configured for the terminal further comprises:

in a case that each of cell signal qualities of the terminal respectively on the plurality of the RAN slices is lower than a preset threshold, taking each of the plurality of the RAN slices as the target RAN slice.

15. The apparatus according to claim 13, wherein the determining the message type to which the target RRC message belongs comprises:

in a case that the target RRC message is for performing a common control function and does not carry user data, determining that the message type to which the target RRC message belongs is a first message type; and in a case that the target RRC message carries the user data, determining that the message type to which the target RRC message belongs is the first message type or a second message type according to a message content of the target RRC message.

16. The apparatus according to claim 15, wherein, in a case that the message type is the first message type, determining the target RAN slice corresponding to the target RRC message which is to be transmitted from among the plurality of the RAN slices pre-configured for the terminal according to the message type comprises:

in a case that the target RRC message is not triggered by a service, selecting a RAN slice that meets a preset condition from among the plurality of the RAN slices as the target RAN slice; and in a case that the target RRC message is triggered by the service, taking a RAN slice corresponding to the service from among the plurality of the RAN slices as the target RAN slice.

17. The apparatus according to claim 15, wherein, in a case that the message type is the second message type, the determining the target RAN slice corresponding to the target RRC message to be transmitted from among the plurality of the RAN slices pre-configured for the terminal according to the message type comprises:

in a case that a number of RAN slices corresponding to the target RRC message is one, taking a RAN slice corresponding to the target RRC message as the target RAN slice; and in a case that the number of the RAN slices corresponding to the target RRC message is more than one, selecting one RAN slice that meets a preset condition from among the RAN slices corresponding to the target RRC message as the target RAN slice.

18. The apparatus according to claim 15, wherein said determining that the message type to which the target RRC message belongs is the first message type or the second message type according to the message content of the target RRC message comprises:

when the target RRC message is a connection reconfiguration message, while the message content is for configuring the RAN slice, determining that the message type to which the target RRC message belongs is the second message type, and while the message content is not for configuring the RAN slice, determining that the message type to which the target RRC message belongs is the first message type; and when the target RRC message is an uplink information transmission message or a downlink information transmission message, while the message content comprises a common Network Attached Storage (NAS) message or it cannot be determined whether an NAS message belongs to the common NAS message, determining that the message type to which the target RRC message belongs is the first message type, and while the message content does not comprise the common NAS message, determining that the message type to which the target RRC message belongs is the second message type.

* * * * *